US012699548B2

(12) United States Patent
Hoshi

(10) Patent No.: US 12,699,548 B2
(45) Date of Patent: Aug. 4, 2026

(54) NON-TRANSITORY COMPUTER-READABLE STORAGE MEDIUM WITH EXECUTABLE DEVELOPMENT PROGRAM STORED THEREON, INFORMATION PROCESSING SYSTEM, INFORMATION PROCESSING APPARATUS, AND INFORMATION PROCESSING METHOD

(71) Applicant: NINTENDO CO., LTD., Kyoto (JP)

(72) Inventor: Kento Hoshi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 142 days.

(21) Appl. No.: 18/348,772

(22) Filed: Jul. 7, 2023

(65) Prior Publication Data

US 2024/0012626 A1 Jan. 11, 2024

(30) Foreign Application Priority Data

Jul. 8, 2022 (JP) ................................. 2022-110524

(51) Int. Cl.
*G06F 8/30* (2018.01)
*G06F 16/21* (2019.01)

(52) U.S. Cl.
CPC ............ *G06F 8/315* (2013.01); *G06F 16/211* (2019.01)

(58) Field of Classification Search
CPC ...................................................... G06F 8/315
See application file for complete search history.

(56) References Cited

U.S. PATENT DOCUMENTS

| | | | | |
|---|---|---|---|---|
| 8,121,976 B2 * | 2/2012 | Kalia | ..................... | G06F 16/284 |
| | | | | 717/136 |
| 9,075,833 B2 * | 7/2015 | Gao | ......................... | G06F 16/84 |
| 9,122,663 B2 * | 9/2015 | Cuzzort | .............. | G06F 16/9024 |
| 9,286,275 B2 * | 3/2016 | Khan | ..................... | G06F 40/143 |
| 9,329,849 B2 * | 5/2016 | Verlaguet | .................. | G06F 8/40 |
| 9,424,003 B1 * | 8/2016 | Neumann | ................. | G06F 8/30 |
| 9,460,198 B1 * | 10/2016 | Aman | ................. | G06F 16/2379 |
| 9,465,590 B2 * | 10/2016 | Ivanov | ....................... | G06F 8/35 |
| 10,067,957 B1 * | 9/2018 | Aman | .................... | G06F 16/353 |
| 10,241,767 B2 * | 3/2019 | Benton | ..................... | G06F 8/47 |
| 10,282,396 B2 * | 5/2019 | Allen | ..................... | G06F 40/221 |
| 10,803,029 B2 * | 10/2020 | Holm | .................... | G06F 16/289 |

(Continued)

FOREIGN PATENT DOCUMENTS

| | | | | | |
|---|---|---|---|---|---|
| CN | 110334326 A | * | 10/2019 | | |
| CN | 110968294 A | * | 4/2020 | .............. | G06F 8/20 |
| JP | 2018032154 A | | 3/2018 | | |

OTHER PUBLICATIONS

Pezoa, Felipe, et al. "Foundations of JSON schema." Proceedings of the 25th international conference on World Wide Web. 2016.*

(Continued)

*Primary Examiner* — Francisco J Aponte

(74) *Attorney, Agent, or Firm* — Scully, Scott, Murphy & Presser, P.C.

(57) ABSTRACT

A development program for development of an application program with a programming language in which an object is generated based on a type is provided. The development program includes instructions for generating or extracting a first type definition of an object from a source code of the application program and instructions for generating a schema file that describes a data structure of the first type definition.

16 Claims, 21 Drawing Sheets

(56) References Cited

U.S. PATENT DOCUMENTS

| | | | | |
|---|---|---|---|---|
| 10,911,379 | B1 * | 2/2021 | Bray | H04L 51/18 |
| 11,175,897 | B1 * | 11/2021 | Deng | G06F 8/51 |
| 11,176,314 | B2 * | 11/2021 | Mueller | G06F 40/14 |
| 11,379,225 | B1 * | 7/2022 | Velusamy | G06F 8/73 |
| 11,693,832 | B2 * | 7/2023 | Barov | G06F 16/211 |
| | | | | 707/803 |
| 12,141,109 | B2 * | 11/2024 | Dasari | G06F 16/258 |
| 12,212,464 | B2 * | 1/2025 | Symeonakis | G06F 3/0484 |
| 2015/0331700 | A1 * | 11/2015 | Grover | G06F 9/45516 |
| | | | | 717/143 |
| 2016/0004729 | A1 * | 1/2016 | Evans | G06F 16/212 |
| | | | | 707/803 |
| 2016/0127322 | A1 * | 5/2016 | Ben-Natan | G06F 21/6254 |
| | | | | 726/26 |
| 2017/0168786 | A1 * | 6/2017 | Beckey | G06F 8/30 |
| 2018/0246984 | A1 * | 8/2018 | Kamiya | G06F 16/84 |
| 2018/0329931 | A1 * | 11/2018 | Baid | G06F 16/213 |
| 2019/0073430 | A1 * | 3/2019 | Webster | G06F 16/25 |
| 2019/0272169 | A1 * | 9/2019 | Russell | G06F 8/35 |
| 2020/0167138 | A1 * | 5/2020 | Schaude | G06F 16/951 |
| 2022/0100774 | A1 * | 3/2022 | Shah | G06F 16/282 |
| 2022/0284073 | A1 * | 9/2022 | Bagchi | G06F 16/9538 |
| 2023/0289251 | A1 * | 9/2023 | Nektalov | G06F 16/2291 |

OTHER PUBLICATIONS

Siers, Willem, et al. "Generating specifications for JSON APIs for formal and semantic use." (2019).*

Frozza, Angelo Augusto, Ronaldo dos Santos Mello, and Felipe de Souza da Costa. "An approach for schema extraction of JSON and extended JSON document collections." 2018 IEEE International Conference on Information Reuse and Integration (IRI). IEEE, 2018.*

Hobmaier, Wolfgang. "Improving the Quality of OpenAPI Specifications Using TypeScript Types and Annotations."—2020.*

Yan, Cong, and Yeye He. "Synthesizing type-detection logic for rich semantic data types using open-source code." Proceedings of the 2018 International Conference on Management of Data. 2018.*

Afsari, Kereshmeh, Charles M. Eastman, and Daniel Castro-Lacouture. "JavaScript Object Notation (JSON) data serialization for IFC schema in web-based BIM data exchange." Automation in Construction (2017).*

MarcoQ, "Typescript JSON schema generator", online, README. md, Nov. 7, 2018, retrieved from <https://gitlab.com/AwesomeObserver/ vscodetypescript-to-json schema/-/blob/master/README.md>, retrieved on Feb. 27, 2026.

* cited by examiner

```
struct MyData
{
    int value1;        —— 11
    float distance;    —— 12
}
```

```
MyData myData1;
myData1.value1 = 10;         —— 21
myData1.distance = 10.f;     —— 22
```

```
0A 00 00 00 00 00 20 41
```
value1      distance

```
{
    "value1": 10,
    "distance": 10.0
}
```

IN SERIALIZATION

RUNNING APPLICATION PROGRAM     118

ASSET     INTERMEDIATE OBJECT     OBJECT 300     133     130     131     120

IN DESERIALIZATION

RUNNING APPLICATION PROGRAM     118

ASSET     INTERMEDIATE OBJECT     OBJECT 300     134     130     132     120

```
// TYPE DEFINITION
class MyData
{
public:    411    412   413   414     415
    BIND_VALUE(value1, int, GetValue1, SetValue1);    410 int GetValue1()
    {
        return value1;                        404
    } void SetValue1(int v)
    {
        value1 = v;                           405
    } private:
    int value1;  —401
};
```

```
// AUTOMATICALLY GENERATED CODE  416        412    413
DEFINE_SERIALIZE_VALUE(MyData, "value1", int)
{
    propertyValue= object->GetValue1();            50A
}
                                416      412    413
DEFINE_DESERIALIZE_VALUE(MyData, "value1", int)
{
    object->SetValue1(propertyValue);              52A
}
```

Figures 10A, 10B:
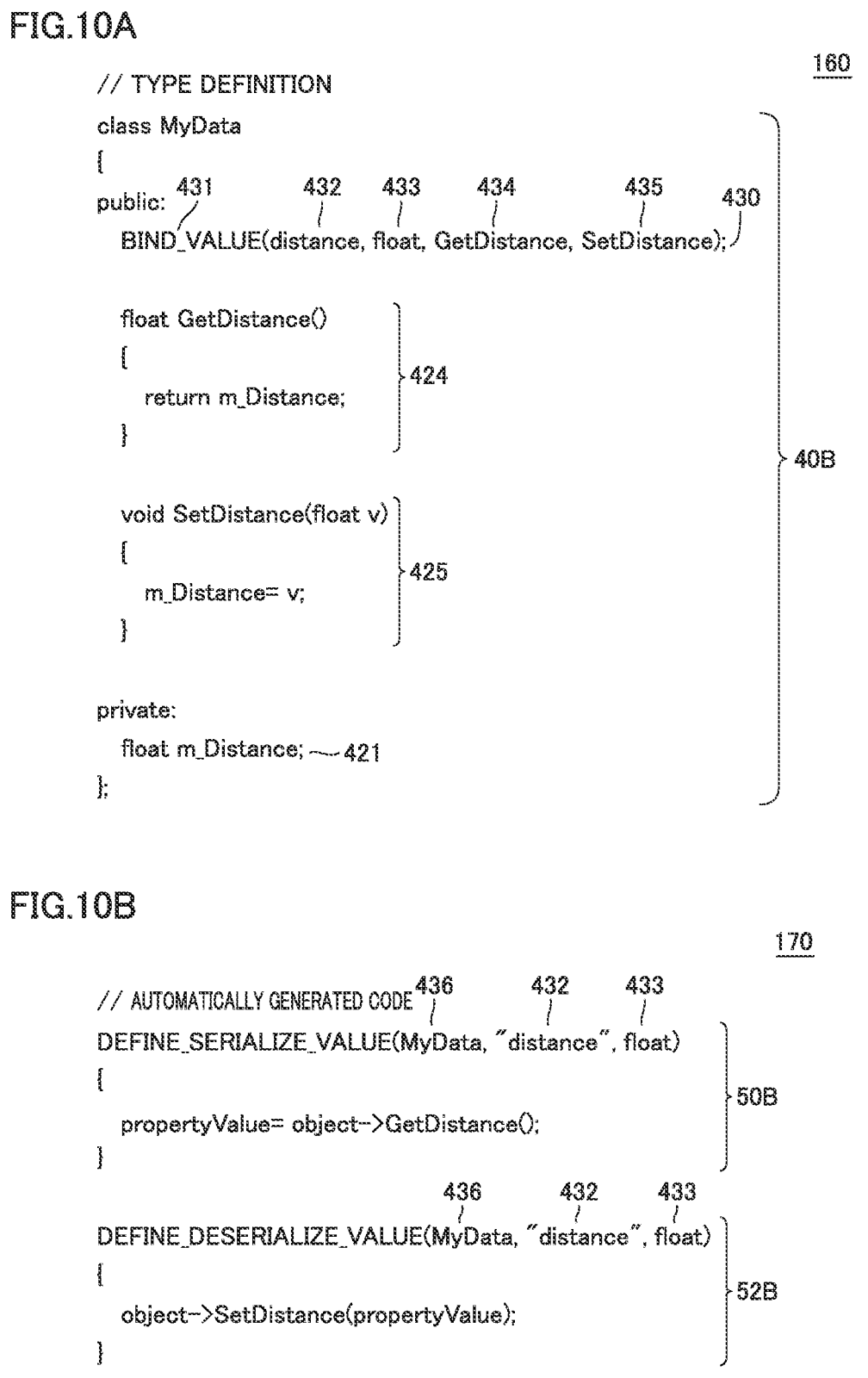

```
// TYPE DEFINITION
class MyData
{
public:    431        432   433      434          435      430
    BIND_VALUE(distance, float, GetDistance, SetDistance);

float GetDistance()
    {
        return m_Distance;              424
    } void SetDistance(float v)
    {
        m_Distance= v;                 425
    } private:
    float m_Distance; ~ 421
};
```

```
// AUTOMATICALLY GENERATED CODE  436      432     433
DEFINE_SERIALIZE_VALUE(MyData, "distance", float)
{
    propertyValue= object->GetDistance();           50B
}
                                 436      432     433
DEFINE_DESERIALIZE_VALUE(MyData, "distance", float)
{
    object->SetDistance(propertyValue);             52B
}
```

Figures 11A, 11B:
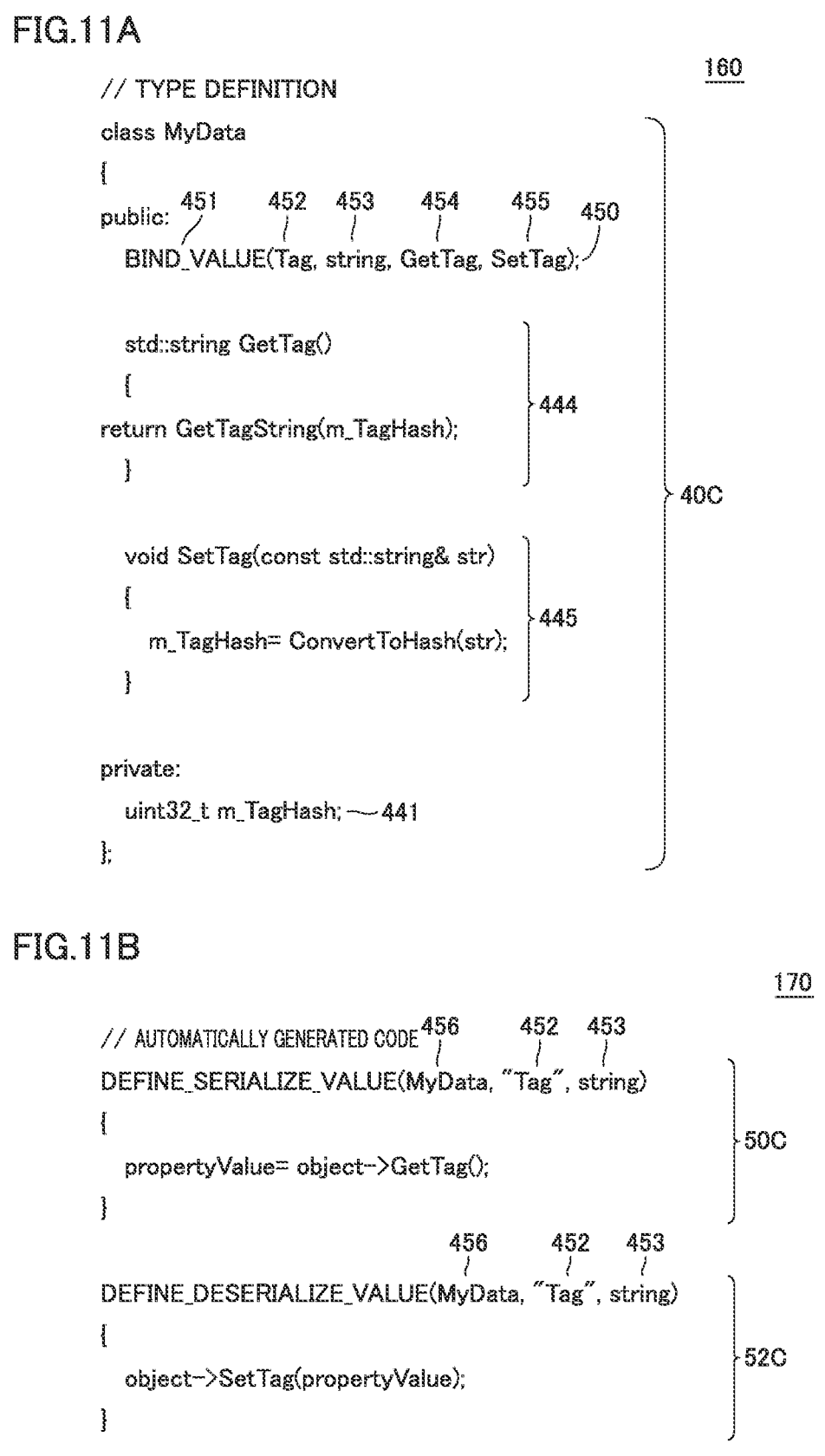

```
// TYPE DEFINITION
class MyData
{
public:    451    452    453    454    455    450
    BIND_VALUE(Tag, string, GetTag, SetTag);

std::string GetTag()
    {
return GetTagString(m_TagHash);                    444
    } void SetTag(const std::string& str)
    {
        m_TagHash= ConvertToHash(str);              445
    } private:
    uint32_t m_TagHash; ──441
};
```

```
// AUTOMATICALLY GENERATED CODE 456    452    453
DEFINE_SERIALIZE_VALUE(MyData, "Tag", string)
{
    propertyValue= object->GetTag();               50C
}
                              456    452    453
DEFINE_DESERIALIZE_VALUE(MyData, "Tag", string)
{
    object->SetTag(propertyValue);                 52C
}
```

```
// TYPE DEFINITION
class MyData
{
public:
    // EXAMPLE IN WHICH VERSION IS EMBEDDED          470
    BIND_VALUE(AssetDataVersion, int, GetVersion, SetVersion);
        471        472            473    474        475
    intGetVersion()
    {
        // HARD-CODE CURRENT LATEST VERSION VALUE AND RETURN HARD-CODED VALUE    464
        return 2;
    }
    void SetVersion(intversion)
    {
        if (version == 1)
        {
            // SWITCH OPERATION, BECAUSE ASSET IS OF OLD VERSION
            EnableOldAssetBehavior();
        }                                                              465

// OTHERWISE, DO NOTHING
    }
    ...
};
```

```
// AUTOMATICALLY GENERATED CODE  476        472          473
DEFINE_SERIALIZE_VALUE(MyData, "AssetDataVersion", int)
{
    propertyValue= object->GetVersion();
}                                                           50D
                               476          472          473
DEFINE_DESERIALIZE_VALUE(MyData, "AssetDataVersion", int)
{
    object->SetVersion(propertyValue);
}                                                           52D
```

```
// AUTOMATICALLY GENERATED CODE
DEFINE_SERIALIZE_VALUE(MyData, "distance", float)
{                                                           } 50B
    propertyValue= object-->GetDistance();
}

DEFINE_DESERIALIZE_VALUE(MyData, "distance", float)
{                                                           } 52B
    object-->SetDistance(propertyValue);
}
```

```
// AUTOMATICALLY GENERATED CODE + USER CHANGE
DEFINE_SERIALIZE_VALUE(MyData, "distance", float)
{                                        ⟋ 501               } 50B
    propertyValue= object-->GetDistance() * 2.0f;
}

DEFINE_DESERIALIZE_VALUE(MyData, "distance", float)
{                                        ⟋ 502               } 52B
    object-->SetDistance(propertyValue) * 0.5f;
}
```

```
class ExternalLibraryData
{
    int dataType;           ~ 61
    float floatValue;       ~ 62
}
```

```
BIND_VALUE_EXTERNAL(ExternalLibraryData, dataType, int, GetDataType, SetDataType);  ~ 63
BIND_VALUE_EXTERNAL(ExternalLibraryData, floatValue, float, GetFloatValue, SetFloatValue);  ~ 64
```

Figures 15A, 15B, 15C:
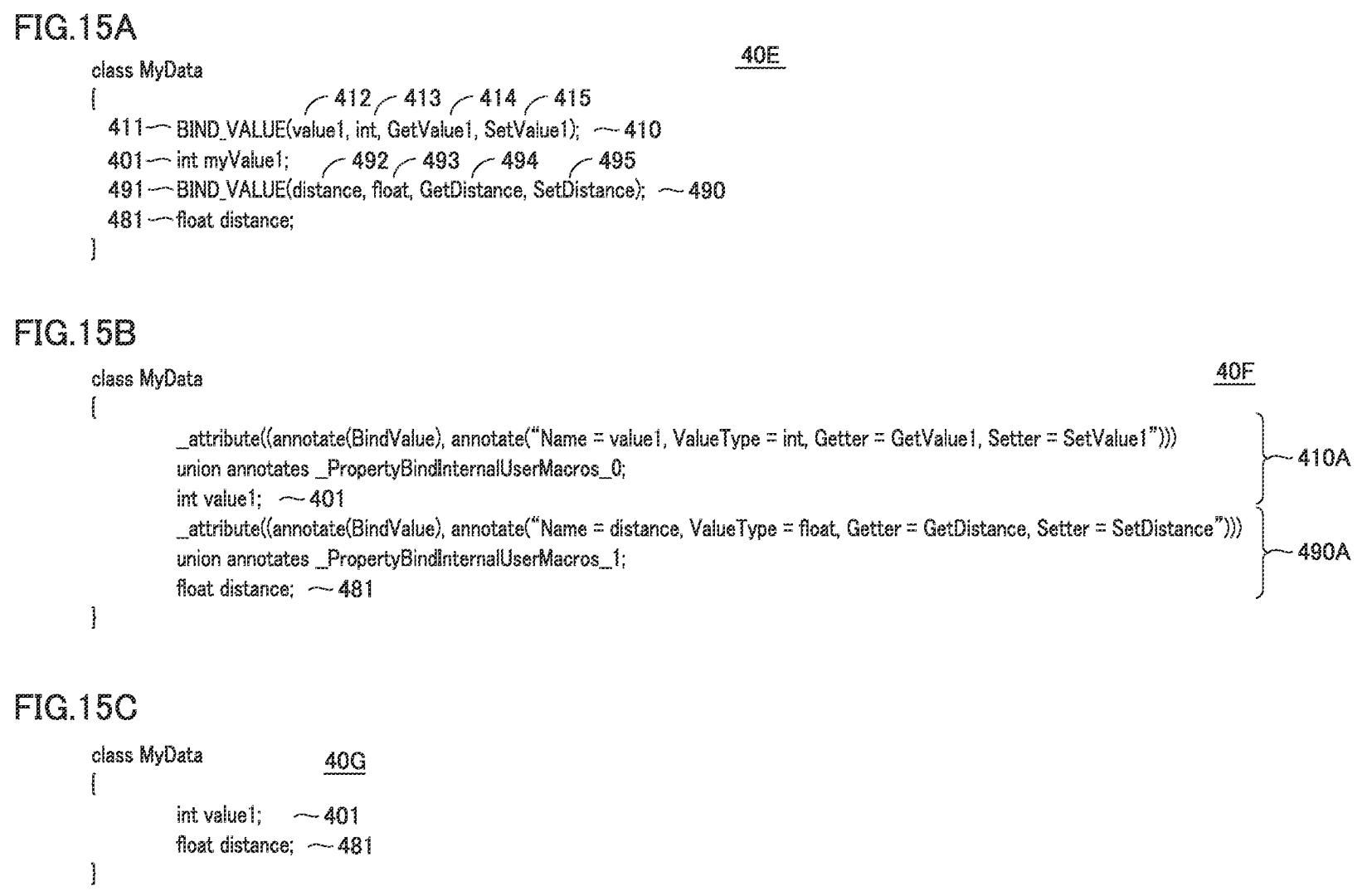

```
class MyData
{
411 — BIND_VALUE(value1, int, GetValue1, SetValue1);    ~ 410
401 — int myValue1;
491 — BIND_VALUE(distance, float, GetDistance, SetDistance);    ~ 490
481 — float distance;
}
```

```
class MyData
{
    _attribute((annotate(BindValue), annotate("Name = value1, ValueType = int, Getter = GetValue1, Setter = SetValue1")))
    union annotates _PropertyBindInternalUserMacros_0;
    int value1;    ~ 401
    _attribute((annotate(BindValue), annotate("Name = distance, ValueType = float, Getter = GetDistance, Setter = SetDistance")))
    union annotates _PropertyBindInternalUserMacros_1;
    float distance;    ~ 481
}
```

```
class MyData
{
    int value1;    ~ 401
    float distance;    ~ 481
}
```

.LoadTo(MyData, "value1")

.LoadTo(MyData, "distance")

.ExtractFrom(MyData, "value1")

.ExtractFrom(MyData, "distance")

FIG.18

```
{                                                                    180
        "name": "MyData",  ——181
        "type_id": "MyData",  ——182
        "schema":{
          "version": 0,
          "properties": {
            "value1": {
              "index": 0,
              "value_type": "int32_t",
              "data_structure": "value",     }183
              "is_primitive_type": true
            },
            "distance": {
              "index": 1,
              "value_type": "float",
              "data_structure": "value",     }184
              "is_primitive_type": true
            }
          }
        },
        "file_format_version": 1  ——185
}
```

FIG.19

NON-TRANSITORY COMPUTER-READABLE STORAGE MEDIUM WITH EXECUTABLE DEVELOPMENT PROGRAM STORED THEREON, INFORMATION PROCESSING SYSTEM, INFORMATION PROCESSING APPARATUS, AND INFORMATION PROCESSING METHOD

This non-provisional application is based on Japanese Patent Application No. 2022-110524 filed on Jul. 8, 2022 with the Japan Patent Office, the entire contents of which are hereby incorporated by reference.

FIELD

The present disclosure relates to an application program development environment and more specifically to data serialization and deserialization.

Processing for writing out (perpetuating) data managed by a running application program to a storage which is referred to as serialization has conventionally been known. Serialized (or later serialized) data is referred to as asset data.

For example, a serialization and data processing apparatus capable of readily achieving storage/recovery of classes and instances of a plurality of versions has been known.

BACKGROUND AND SUMMARY

Asset data written out by serialization has such a simple data structure that, for example, a property name and a corresponding value are brought in correspondence with each other. Such a data structure does not give rise to a problem in a case where an application program which is a source of serialization uses again the asset data, however, there is not sufficient information on the data structure. Therefore, handling of the asset data may be restricted.

One object of the present disclosure is to realize a method of facilitating handling of asset data by providing information that allows reference to a type definition of an object of an application program.

(Configuration 1) According to one embodiment, a development program for development of an application program with a programming language in which an object is generated based on a type is provided. The development program causes a computer of an information processing apparatus to function as an analysis module that generates or extracts a first type definition of an object from a source code of the application program and a generation module that generates a schema file that describes a data structure of the first type definition.

According to Configuration 1, the first type definition of the object from which asset data can be derived can be generated or extracted from the source code of the application program. Concurrently, a schema file that describes the data structure of the type definition of the object from which asset data can be derived can be generated. Handling of the outputted asset data can be facilitated by reference to the schema file.

(Configuration 2) In the configuration, the analysis module may generate the first type definition based on a predetermined description included in the source code. According to Configuration 2, the first type definition can automatically be generated based on the predetermined description included in the source code.

(Configuration 3) In Configuration 2, the predetermined description may include a name of a property included in the first type definition and a description that designates a data type of a value of the property. According to Configuration 3, information necessary for generation of the schema file can be obtained from the predetermined description.

(Configuration 4) In any one of Configurations 1 to 3, the analysis module may generate as the first type definition, a type definition for storage as asset data, of data corresponding to an object generated in accordance with a second type definition included in the source code. The schema file may describe the data structure of a type definition for storage as the asset data. According to Configuration 4, the data structure of the type definition for storage as the asset data can be included in the schema file.

(Configuration 5) In any one of Configurations 1 to 4, the generation module may add the first type definition and a code that generates an object based on the first type definition to the source code of the application program. The object can be generated based on the first type definition by execution of the application program.

(Configuration 6) In Configuration 5, the generation module may generate a code that generates the object, together with generation of the schema file. According to Configuration 6, since the schema file corresponding to the code that generates the object can be generated, there is no discrepancy therebetween.

(Configuration 7) In any one of Configurations 1 to 6, the schema file may include a name of a property included in the first type definition and information indicating a data type of a value of the property. According to Configuration 7, the name and the value of the property included in the first type definition can be identified by reference to the schema file.

(Configuration 8) In any one of Configurations 1 to 7, the generation module may output the schema file in a general-purpose format. According to Configuration 8, various edition tools capable of handling the general-purpose format can be used.

(Configuration 9) According to another embodiment, an information processing system that develops an application program with a programming language in which an object is generated based on a type is provided. The information processing system includes an analysis module that generates or extracts a first type definition of an object from a source code of the application program, a generation module that generates a schema file that describes a data structure of the first type definition, and an edition tool that performs at least one of creation, edition, or representation of asset data based on the schema file.

According to Configuration 9, creation, edition, representation, and the like of the outputted asset data can be facilitated by reference to the generated schema file.

(Configuration 10) In Configuration 9, the edition tool may create or edit the asset data outputted from the application program in accordance with an operation by a user. According to Configuration 9, the user can use the schema file to freely create or edit the asset data.

(Configuration 11) In Configuration 9 or 10, the edition tool may create the asset data available to the application program in accordance with an operation by a user. According to Configuration 11, the user can use the schema file to freely create the asset data even when the application program is not running.

(Configuration 12) In any one of Configurations 9 to 11, the edition tool may receive the asset data outputted from a running application program and transmit the asset data to the running application program. According to Configuration 12, the asset data can directly be exchanged between the edition tool and the running application program.

(Configuration 13) According to another embodiment, an information processing apparatus including one or more processors and a memory where a development program for development of an application program with a programming language in which an object is generated based on a type is stored is provided. The information processing apparatus is configured to perform, by execution of the development program by the one or more processors, generating or extracting a first type definition of an object from a source code of the application program and generating a schema file that describes a data structure of the first type definition.

(Configuration 14) According to another embodiment, an information processing method performed by a computer for development of an application program with a programming language in which an object is generated based on a type is provided. The information processing method includes generating or extracting a first type definition of an object from a source code of the application program and generating a schema file that describes a data structure of the first type definition.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2A to 2C show exemplary illustrative non-limiting drawings illustrating a type and an object generated based on the type.

FIG. 3 shows an exemplary illustrative non-limiting drawing illustrating asset data generated by serialization.

FIGS. 8A and 8B show exemplary illustrative non-limiting drawings illustrating a serialization definition description and an additional code generated based thereon.

FIGS. 10A, 10B, 11A, 11B, 12A, and 12B show exemplary illustrative non-limiting drawings each illustrating a serialization definition description and an additional code generated based thereon.

FIGS. 13A and 13B show exemplary illustrative non-limiting drawings illustrating a result of edition of an automatically generated additional code.

FIGS. 14A and 14B show exemplary illustrative non-limiting drawings illustrating a serialization definition description explicitly including a type designation description.

FIGS. 15A to 15C show exemplary illustrative non-limiting drawings illustrating handling of a serialization definition description at the time of build in the information processing apparatus according to the present embodiment.

FIG. 18 shows an exemplary illustrative non-limiting drawing illustrating a schema file generated by the information processing apparatus according to the present embodiment.

FIGS. 19 to 21 show exemplary illustrative non-limiting drawings illustrating a method of using the schema file generated by the information processing apparatus according to the present embodiment.

DETAILED DESCRIPTION OF NON-LIMITING EXAMPLE EMBODIMENTS

Figure 1:
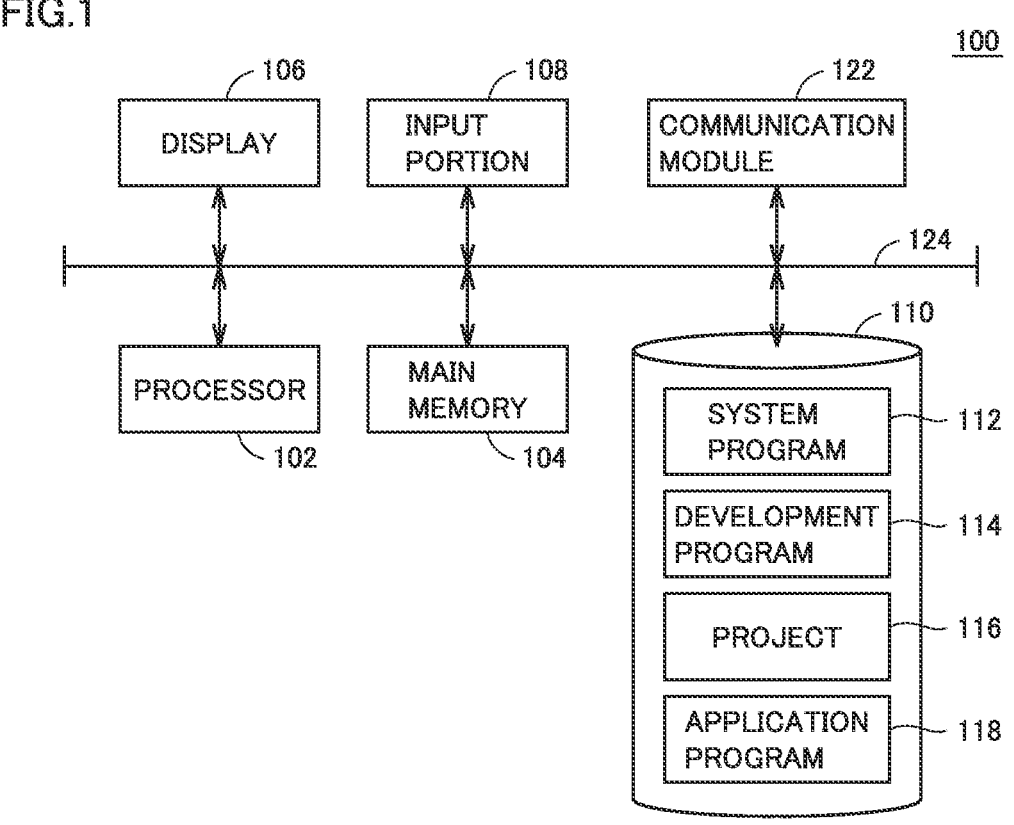
FIG. 1 shows an exemplary illustrative non-limiting drawing illustrating a hardware configuration of an information processing apparatus according to the present embodiment.

The present embodiment will be described in detail with reference to the drawings. The same or corresponding elements in the drawings have the same reference characters allotted and description thereof will not be repeated.

[A. Overview]

In the present embodiment, a development program and an information processing apparatus for development of an application program with a programming language (typically, an object-oriented language) in which an object (instance) is generated based on a type are exemplified. A source code of the application program is described in the programming language in which the object is generated based on the type.

The information processing apparatus according to the present embodiment does not output data held by the object (instance) generated by the application program (run-time program) in a type definition of that object in serialization of the data but additionally generates a code such that asset data can be outputted in a data structure independent of the type definition. The application program that is developed may be a game program, a practical application program, or a development tool program.

According to this configuration, asset data of any data structure (type) can be outputted independently of the type definition of the object to be serialized, and hence flexibility and/or convenience of program development can be improved. For example, even when the type definition is changed (a member is added or deleted, a name of a property is changed, or a data type of a property is changed) in the middle of development of the application program or even when an expression of a type is different depending on a program environment, outputted asset data can be used for general purposes. In addition, data that is not present in a type of an object to be serialized or data of a data type different from that of an object to be serialized can be included in the asset data.

[B. Exemplary Hardware Configuration]

Any exemplary hardware configuration may be adopted in the information processing apparatus according to the present embodiment. The information processing apparatus may be implemented by a single computer that executes one or more programs. The computer may be stationary or portable. Alternatively, the information processing apparatus may be implemented by a plurality of computers. When the plurality of computers are used, computing resources provided by a cloud environment on a network may be used. Therefore, the term "information processing apparatus" herein encompasses an "information processing system" including a plurality of computers or computing resources.

In the description below, for simplification of description, an exemplary configuration in which an information processing apparatus is implemented by a single computer will be described. The technical scope of the subject application, however, is not limited to the configuration where the information processing apparatus is implemented by a single computer.

Referring to FIG. 1, an information processing apparatus 100 includes, as its main hardware components, one or more processors 102, a memory 104, a display 106, an input portion 108, a storage 110, and a communication module 122. These hardware components are connected to one another to communicate through a bus 124.

Processor 102 is a computing unit that executes instructions in accordance with a machine code developed on memory 104, and it is implemented, for example, by a central processing unit (CPU) or a graphics processing unit (GPU).

Memory 104 is a volatile storage where a machine code for execution of instructions by processor 102 or various types of work data are temporarily stored, and it is implemented, for example, by a dynamic random access memory (DRAM) or a static random access memory (SRAM).

Display 106 shows image information generated by computing processing in processor 102, and it is implemented, for example, by a display device such as a liquid crystal display (LCD) or an organic electroluminescent (EL) display.

Input portion 108 is implemented, for example, by an input device such as a mouse and/or a keyboard that accepts an operation by a user.

Storage 110 is a non-volatile storage where data generated and used in information processing apparatus 100 is stored in a non-volatile manner, and it is implemented, for example, by a solid state drive (SSD) or a hard disk drive (HDD). Typically, a system program 112 including an operating system (OS) or a driver, a development program 114 for development of an application program, and a project 116 including a source code are stored in storage 110. An application program 118 (executable file) generated from project 116 may be stored in storage 110.

Development program 114 is a program for development of application program 118, and provides a function necessary for development of application program 118 such as creation and edition of a source code of application program 118, compilation of a source code, link of an object generated by compilation. Development program 114 further provides a function and processing as will be described later.

Development program 114 may be stored in storage 110 in a stage of manufacturing of information processing apparatus 100 or may be provided by downloading from a distribution server (not shown). Furthermore, a computer readable storage medium (for example, a universal serial bus (USB) memory or a memory card) (not shown) where development program 114 is stored may be attached to information processing apparatus 100, and development program 114 may be read from the attached computer readable storage medium and installed in storage 110.

Though a single development program 114 is shown for the sake of convenience of the description, the development program may be configured with a plurality of programs. For example, a module or a library for performing the function and the processing as will be described later may be added (add-on) to a program that provides a basic development environment. Therefore, not only a single development program that implements all of the function and the processing as will be described later but also one or more modules or libraries for performing the function and the processing as will be described later are within the technical scope of the present invention.

Communication module 122 is a module for wireless communication with an external apparatus, and it is implemented, for example, by a module for Ethernet™ wireless LAN, or the like.

Though FIG. 1 shows a form where various types of processing are implemented by execution of a program (system program 112 and development program 114) by processor 102 (that is, software implementation), a part or the entirety of the processing may be implemented by hard-wired circuitry. Specifically, a part or the entirety of the function and the processing to be provided by information processing apparatus 100 may be implemented by processing circuitry including an application specific integrated circuit (ASIC) or a field-programmable gate array (FPGA). The processing circuitry may include processor 102 and memory 104. Therefore, the function and the processing to be provided by information processing apparatus 100 can also be defined as being implemented by processing circuitry including such hard-wired circuitry as processor 102 and memory 104 and/or an ASIC or an FPGA.

[C. Serialization and Deserialization]

Serialization and deserialization will now be described.

Serialization refers to processing for writing out (perpetuating) data managed by a program (which is normally arranged on a memory) to a storage or the like. In the description below, perpetuated data and data to be perpetuated are referred to as "asset data."

Deserialization refers to processing for reading (developing on a memory) data (asset data) perpetuated on the storage or the like, so as to be processible by a program. The asset data may be stored not only in the storage but also in a read only memory (ROM) or a server on a network.

An exemplary data structure generated and managed by a program will be described in connection with serialization and deserialization.

A type and an object generated based on the type will be described with reference to FIGS. 2A to 2C. FIGS. 2A to 2C show exemplary codes in accordance with C++ by way of example.

FIG. 2A shows an exemplary code of a type definition. The type represents a data structure used on a program. FIG. 2A shows an example (reference 10) of a MyData type defined as a struct. In the exemplary code, the MyData type is defined to include as members, a property value1 (reference 11) that holds data of the integer type and a property distance (reference 12) that holds data of the floating point type.

The definition of the type can thus include definitions of a data structure handled by the program and a behavior (the data type of the property).

FIG. 2B shows an exemplary code for generation of an object from the type defined in FIG. 2A. The object is a data entity that holds a specific value. The value (data) held by the object is arranged on the memory.

FIG. 2B shows an exemplary code that generates myData1 (reference 20) which is the object of the MyData type and has a specific value held. Object myData1 holds "10" (reference 21) as a value of property value1 and holds "10.f" as property distance (reference 22). ".f" is an expression indicating a numerical value of the floating point type.

FIG. 2C shows an exemplary state (a binary expression) in which the value (data) held by the object shown in FIG. 2B is arranged on the memory (reference 25). As shown in FIG. 2C, respective values of property value 1 and property distance are simply successively arranged on the memory.

When the data on the object arranged on the memory as shown in FIG. 2C is stored as it is, a problem may arise in subsequent handling of the data. For example, the data on the memory is composed only of values arranged in accordance with the order of defined properties. Therefore, for example, when a property is added, the type after such change and the value included in the data cannot appropriately be brought in correspondence with each other.

Even for values of a similar data type, binary expressions may be different depending on the OS, an architecture of the processor, a programing language, or a version of the programming language. Therefore, even when the binary expression generated in a specific environment is stored as it is, the binary expression may not appropriately be read as it is in a different environment.

In order to address the problem as described above, an approach to serialization in a general-purpose format (for example, in a JSON format) is employed.

Exemplary asset data 300 generated by serialization will be described with reference to FIG. 3. FIG. 3 shows asset data 300 in the JSON format by way of example. In the JSON format, a pair of a key and a value is described as being delimited by a colon.

In the example shown in FIG. 3, asset data 300 includes a pair of a name "value1" and a value and a pair of a name "distance" and a value as properties. In the description below, each of "value1" and "distance" included in asset data 300 is referred to as a name of a property and each corresponding value is referred to as a value of the property.

Asset data 300 generated by serialization may be, for example, in an XML format where a tag is used, in addition to the JSON format. Furthermore, any other format may be adopted.

Data can be handled for general purposes by generation of asset data 300 composed of a pair of a name and a value as shown in FIG. 3. By adopting the general-purpose format such as the JSON format or the XML format, a library provided for general purposes can be used. Thus, in any environment, the same asset data 300 can be read and used in a program.

Since processing can be performed in units of the pair of the name and the value, asset data 300 can be made use of. For example, when there is no property corresponding to the type that has been changed, reading of data included in asset data 300 should only be skipped.

Information processing apparatus 100 according to the present embodiment provides a scheme to allow asset data 300 as shown in FIG. 3 to more readily be used.

[D. Support for Serialization and Deserialization]

A function and processing for support for serialization and deserialization by information processing apparatus 100 according to the present embodiment will now be described.

Information processing apparatus 100 according to the present embodiment supports serialization and deserialization of a program described in a statically typed language (for example, C++). In other words, the kind of a programming language of interest is not limited so long as the programming language falls under the statically typed language.

In the statically typed language, a type of an object generated by execution of a program is defined in advance with a source code. A function is based on the premise that only an object of a predetermined type is processed. Therefore, serialization for general purposes with the function is difficult. Some dynamically typed languages may perform a function to easily serialize an object.

In the present embodiment, a code for implementation of serialization and deserialization which characterizes the present embodiment is automatically generated by addition of a predetermined description to a source code of application program 118. For the sake of convenience of description, this added predetermined description is referred to as a "serialization definition description" and an automatically generated code is referred to as an "additional code." A user (a developer of application program 118) creates a source code (a source code 160 shown in FIG. 5 or the like which will be described later) by operating an editor or the like. The source code created by the developer is referred to as an "original source code" for the sake of convenience for distinction from the additional code.

The additional code is executed as processing for holding data on a target object of application program 118 (serialization). The additional code may be executed as processing for holding a target value as a value of a member variable of the target object of application program 118 (deserialization).

The serialization definition description is a description that defines contents of serialization (and deserialization). This description designates a type (definition) of an object to be serialized among objects of application program 118. In the present embodiment, by designation of a type to be serialized among types defined in the source code of application program 118, an object generated in the designated type is serialized (a type designated to be serialized in the description below is referred to as a "serialization target type"). In the present embodiment, when there are a plurality of objects (instances) generated with the use of the serialization target type, each object is serialized. The serialization definition description is described in the source code of application program 118 by the user (developer of application program 118).

The serialization definition description in one embodiment includes (1) to (4) below.

(1) A description designating a serialization target type (which is referred to as a "type designation description" below)

A type designation description designates a type of an object, data on which is to be held. A name of the type of the object to be serialized may be described as the type designation description. Alternatively, by arranging the serialization definition description in the type definition to be serialized (or at a proximate position), that type may be designated as a type to be serialized.

(2) A description designating a function for serialization and deserialization (which is referred to as a "function designation description" below)

As a function designation description, a member function of a type to be serialized may be designated, however, any function different therefrom may be designated. In the present embodiment, each of a function used for serialization (a description designating the function is referred to as a "serialization function designation description" below) and a function used for deserialization (a description designating the function is referred to as a "deserialization function designation description" below) is designated.

The serialization function designation description designates a function and/or any variable for obtaining a value. A function designated in connection with the serialization function designation description is a function to obtain a value to be held in a property of asset data. Though a function that returns a value of a property of an object to be serialized as it is may be designated, any function may be applicable without being limited. A function that returns a value of a result of some computation with the use of a value of the property of the object to be serialized or a function that uses no value of the property of the object to be serialized (a constant value, a character string, a value of the property of a member of another type, or a result of computation with the use of the value) may be applicable.

The function designated in the serialization function designation description may thus be a function that obtains (as it is) a value of the property of the object to be serialized or a function that obtains a result of predetermined computation with the use of the value of the property of the object to be serialized. Furthermore, the function designated in the serialization function designation description may be a function that obtains a predetermined constant.

A deserialization function designation description also designates a function. A function designated in connection with the deserialization function designation description is a function that sets a value of the property of the object of application program 118 with the use of a value of a property of asset data. Though this function may be a function that sets the value of the property of the asset data as it is as the value of the object of application program 118, any function may be applicable without being limited. A function that sets a value of a result of some computation with the use of a value of the property of the asset data as the value of the object of application data 118 or a function that uses no value of the property of the asset data (a constant value, a character string, a value of the property of asset data of another type, or a result of computation with the use of the value) may be applicable.

The function designated in the deserialization function designation description may thus be a function that obtains (as it is) a value of the property of the asset data or a function that obtains a result of predetermined computation with the use of the value of the property of the asset data. Furthermore, the function designated in the deserialization function designation description may be a function that obtains a predetermined constant.

(3) A description designating a name of a property in asset data (which is referred to as a "name designation description" below)

The name designation description designates a data name which is a property name. The property name designated as the name designation description is also a property name in an intermediate object which will be described later.

(4) A description designating a data type of a property in asset data (which is referred to as a "data type designation description" below)

The data type designated as the data type designation description is also a data type of a property in an intermediate object which will be described later.

In the present embodiment, the object is held as the intermediate object before the object is held as asset data. Thereafter, this intermediate object is serialized and held as the asset data. In this case, a section explained in connection with "asset data" in the description above is understood as the explanation about the "intermediate object." In other words, the intermediate object may be stored as the asset data.

As processing described in the additional code is performed while application program 118 is running, the type definition of the object to be serialized in the original source code and the data structure in the asset data can be independent of each other.

For example, in the serialization function designation description, by designation of a function that outputs a value (itself) of a property (a name of which is a "property A") which is a member of the object of application program 118 and designation of a name (for example, a "property B") different from the name of property A in the name designation description, the value of the property (the value of "property A") of the object of application program 118 can be stored in the asset data (or the intermediate object, to be understood similarly below) under a different name ("property B").

In contrast, by designation of a function that sets the value of the property of the asset data as it is as the value of "property A" of the object of application program 118 in the deserialization function designation description and designation of "property B" in the name designation description, the asset data can also be deserialized under a name different from the property name of the asset data in reading of the asset data.

By designation of a data type (for example, the string type) different from the data type (for example, the int type) of "property A" in the data type designation description, the value of the property of the object of application program 118 can be stored in the asset data in the different data type.

By designation of a function that outputs a value resulting from some computation with the use of the value of property A of the object of application program 118 in the serialization function designation description, not the value itself of the property of the object of application program 118 but the value resulting from computation can be stored in the asset data.

Furthermore, by designation of a function that outputs data irrelevant to the member of the object of application program 118 in the serialization function designation description, any data that is not present in the object of application program 118 can be stored in the asset data.

In the present embodiment, a function for serialization and deserialization is designated. Since any code can be written in these functions, in serialization, a degree of freedom of a value held by the property of the asset data can be higher, and in deserialization, a degree of freedom of a value held by the property on an application program side can be higher.

Instead of the function, however, (a name of) a variable or (a name of) a constant may be designated for at least one of serialization and deserialization. In that case, the value held by the property of the asset data is a value of the variable or a value of the constant (serialization), and the value held by the property on the application program side is a value of the variable or a value of the constant (deserialization). These variables or constants may each be a member variable of the object to be serialized, or an external variable or an external constant.

In the present embodiment, in designation of a serialization target, a type of the original source code is designated. Though all of objects generated in the designated type are to be serialized in that case, only at least one of the objects may be designated as the serialization target.

A specific example of the serialization definition description will be described later.

The term "procedure" herein means a description for performing specific processing in a program. The "procedure" includes, for example, a function, a member function, a method, a command, a sub routine, a sub program, and the like. In the description below, the function or the member function will mainly be described as an exemplary "procedure".

As will be described later, the additional code is added to the source code (included in project 116) of application program 118 described by the developer of application program 118, and then application program 118 is generated (built). As the additional code is added, while application program 118 is running, the intermediate object (an object expected to be stored as asset data, details of which will be described later) for writing (serialization) and reading (deserialization) of asset data 300 is automatically generated.

An exemplary state of execution of application program 118 generated by information processing apparatus 100 according to the present embodiment will be described with reference to FIG. 4. Application program 118 is generated from project 116 including the additional code.

Figure 4:
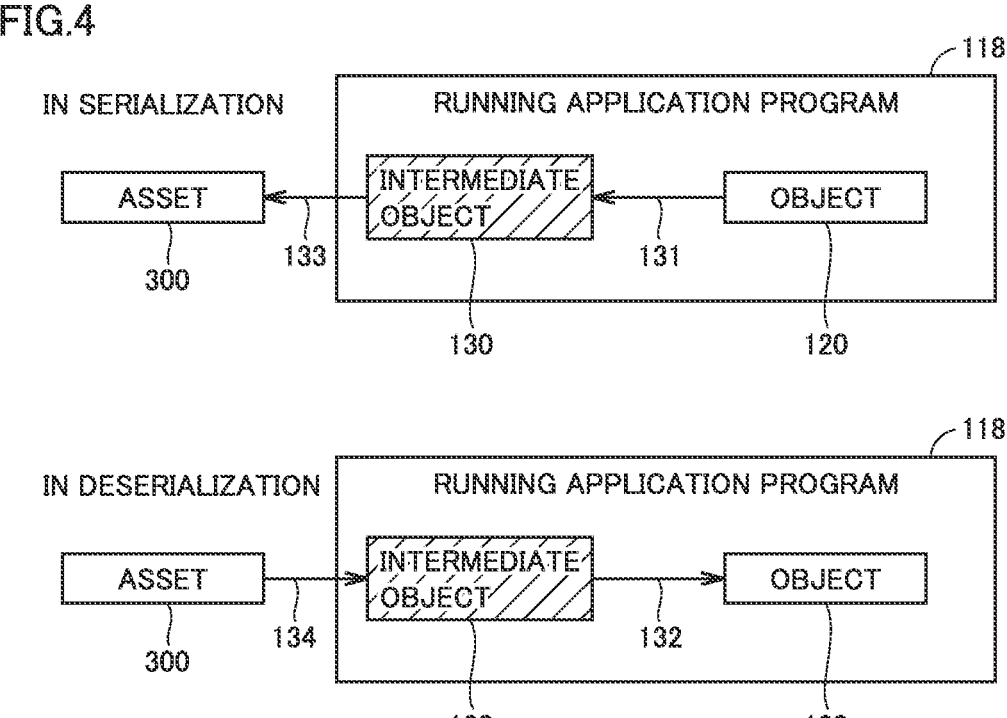
FIG. 4 shows an exemplary illustrative non-limiting drawing illustrating a running state of an application program generated by the information processing apparatus according to the present embodiment.

Referring to FIG. 4, while application program 118 is running, an intermediate object 130 is generated as a result of processing described in the additional code, in addition to any object 120 (which may be referred to as an "original object" in the description below) in the original source code. By being called at any timing, intermediate object 130 can perform processing necessary for serialization and deserialization.

The data structure (type) of intermediate object 130 can be defined in any manner Data held by intermediate object 130 can also freely be edited.

More specifically, the additional code includes (1) to (5) below.

(1) (One or more) type definitions of intermediate object 130

Intermediate object 130 is generated in accordance with a code in (1). More specifically, (1) is a code that defines a type of intermediate object 130 to hold a property below as a member.

Property Name: A name designated in the name designation description of the serialization definition description Data type: A data type designated in the type designation description of the serialization definition description Thus, (1) refers to a code that defines the type having the member variable of the designated property name based on the property name (data name) designated in the name designation description. In addition, (1) refers also to a code that defines the type having the member variable of the data type designated in the type designation description. In the code of (1), the type of intermediate object 130 may be defined independently of the type definition within corresponding source code 160.

When there are a plurality of serialization definition descriptions for one type, the member is generated for each of them, and consequently the type of intermediate object 130 is in such a structure as having a plurality of properties.

A name of the type of intermediate object 130 is automatically set, for example, by addition of an auxiliary name to the serialization target type (though any name may be given, for example, in an example where the type name to be serialized is "MyData", the name of the type of intermediate object 130 may automatically be determined as "MyData_IntermediateObject").

For intermediate object 130, for example, a member function as below may be implemented.

(A) LoadTo Function: A function that calls a "deserialization code" which will be described later (B) ExtractFrom Function: A function that calls a "serialization code" which will be described later (C) CreateDiff Function: A function that generates new intermediate object 130 having only a difference between the property held by designated intermediate object 130 and the property held by intermediate object 130 to which the function belongs (D) ApplyDiff Function: A function that reflects intermediate object 130 having only the property of the difference generated by CreateDiff Function shown in (C) or the like on intermediate object 130 to which the function belongs (E) Clone Function: A function that generates new intermediate object 130 by duplicating intermediate object 130 to which the function belongs (F) Exclude Function: A function that excludes a designated property from among properties held by intermediate object 130 to which the function belongs (G) ExcludeAll Function: A function that excludes all properties held by intermediate object 130 to which the function belongs (H) Include Function: A function that sets, as a processing target, a designated property among properties held by intermediate object 130 to which the function belongs (I) Sanitize Function: A function for inspection as to whether or not intermediate object 130 to which the function belongs meets such a restriction that the value of the property is included in a corresponding serialization definition description (for example, within a designated range)

(J) GetPath Function: A function that obtains a path on a property tree of intermediate object 130 to which the function belongs (K) GetTypeId Function: A function that obtains a hash value indicating the type corresponding to data held by intermediate object 130 to which the function belongs (L) GetStringTypeId Function: A function that obtains a name (character string) of the type corresponding to data held by intermediate object 130 to which the function belongs (M) HasProperty Function: A function that determines whether or not intermediate object 130 to which the function belongs has a designated property (N) GetProperty Function: A function that obtains a value of the designated property held by intermediate object 130 to which the function belongs (O) GetDataFormatVersion Function: A function that obtains a version of data held by intermediate object 130 to which the function belongs The type of intermediate object 130 may be defined to inherit a common type definition. In this case, the type definition of intermediate object 130 included in the additional code defines the type so as to inherit the common type having at least one member function. For example, when the common type definition has the general-purpose member function, any intermediate object 130 can also have that member function. All or at least one of the functions shown in (A) to (0) described above may be the member function of the common type definition.

When there are a plurality of serialization target types, the type of intermediate object 130 is generated for each serialization target type.

Information processing apparatus 100 thus generates the type definition of intermediate object 130 from source code 160 of application program 118. The type definition of intermediate object 130 corresponds to the type definition for storage as the asset data, of data corresponding to the object generated based on the type definition to be serialized included in source code 160.

The type definition of intermediate object 130 may be extracted (as it is) from the type definition included in source code 160 of application program 118.

(2) A code where a function for generation (instantiation) of intermediate object 130 is described The code in (2) refers to a code that performs processing for generating an intermediate object based on the type (type definition) defined in the code in (1). Specifically, the code in (2) is for generating intermediate object 130 for the asset data corresponding to each of objects of application program 118 generated based on the type definition in source code 160 of application program 118. The code in (2) refers also to a code that performs processing for generating an intermediate object when processing for holding data of the target object is performed (serialization).

When there are a plurality of objects (instances) generated with the use of the serialization target type, intermediate object 130 is individually generated for each of them.

Intermediate object 130 is actually generated at timing of execution of this code. For example, this code is executed when a certain object is serialized (for the first time), and corresponding intermediate object 130 is generated. When the object to be serialized is generated, at that timing, corresponding intermediate object 130 may be generated.

(3) A code where a function (which is referred to as a "serialization code" below, a specific example of which is shown as DEFINE_SERIALIZE_VALUE( ) in FIG. 8B) (an interface 131) for reading an output value of a function designated in a serialization function designation description into a property of a name designated in a name designation description is described The serialization code included in the additional code is for performing processing for holding, as data corresponding to a target object, a value obtained by a function designated in the serialization function designation description or a value of a variable designated in the serialization function designation description under the data name (property name) designated in the name designation description. At this time, the serialization code is a code that performs processing for holding the value obtained by the function or the value of the designated variable, as the value of the member variable of intermediate object 130 generated by the code in (2). The serialization code may be a code for performing processing for holding a value obtained by a function designated in advance or a value designated in advance in intermediate object 130.

The data corresponding to the target object may be asset data corresponding to the target object or data expected to be held as the asset data (the value of the corresponding property of the intermediate object).

(4) A code where a function (which is referred to as a "deserialization code" below, a specific example of which is shown as DEFINE_DESERIALIZE_VALUE( ) in FIG. 8B) (an interface 132) that passes a value of a property of a name designated in a name designation description to a function designated in a deserialization function designation description is described The deserialization code included in the additional code is for performing processing for passing the value of the data name (property name) designated in the name designation description held by the asset data to the function designated in the deserialization function designation description. For example, with the function designated in the deserialization function designation description, the value of the property of the name designated in the (passed) name designated description is used to set the value of the corresponding property of the object of the serialization target type. The deserialization code may be a code for performing processing for passing the value of the property held by intermediate object 130 to the function designated in advance.

(5) A code that performs processing for registering a pointer of a generated function By automatic addition of the additional code composed of a code group as described above to the original source code, the type of intermediate object 130 is defined ((1) above), intermediate object 130 is generated ((2) above), the code that sets the value of the property of intermediate object 130 with the use of any function (a function designated in the serialization function designation description) is added ((3) above), and a code that passes the value of the property of intermediate object 130 to any function (a function designated in the deserialization function designation description) can be added ((4) above).

The additional code may further include (6) to (8) below.

(6) A code where a function (an interface 133) for writing out a value held by intermediate object 130 to asset data 300 (serialization) is described (7) A code where a function (an interface 134) for reading asset data 300 to intermediate object 130 (deserialization) is described The functions in (6) and (7) may be implemented as the member functions of intermediate object 130.

A GenerateJSON function may be implemented in intermediate object 130 by way of example of (6).

As the GenerateJSON function is called, a pair of a property name (variable name) held by intermediate object 130 and a corresponding value may be generated as data in the JSON format.

Alternatively, a GenerateXML function may be implemented in intermediate object 130. As the GenerateXML function is called, a pair of a property name (variable name) held by intermediate object 130 and a corresponding value may be generated as data in the XML format.

The format for output of the name and the value of the property held by intermediate object 130 may be such a general-purpose format as the JSON format and the XML format.

Thus, (6) is for performing processing for output of the value of the property of intermediate object 130 in a predetermine format for each type of intermediate object 130. The type definition (the code in (1) described above) of intermediate object 130 may include a code for performing processing for calling such processing.

An ExtractJSON function may be implemented in intermediate object 130 by way of example of (7). In this case, empty intermediate object 130 is generated (instantiated), asset data 300 to be read is designated, and the ExtractJSON function is called. A pair of a property name (variable name) described in asset data 300 and a corresponding value is thus read in intermediate object 130.

Alternatively, a Deserialize function for reading data from asset data 300 may be prepared. The Deserialize function is called, with asset data 300 to be read being designated and a type ID indicating a type of intermediate object 130 into which asset data 300 is to be read being designated. The Deserialize function parses designated asset data 300 to be read and reads the pair of the property name (variable name) described in asset data 300 and the corresponding value. In succession, intermediate object 130 corresponding to the designated type ID is generated (instantiated), and data read from asset data 300 is set in generated intermediate object 130.

Any library or the like can also be used for exchange of data between intermediate object 130 and asset data 300 (serialization (writing) and deserialization (reading)).

When the codes in (6) and (7) are not automatically generated as the additional codes, the developer of application program 118 describes these codes.

Depending on application program 118, only one of serialization and deserialization may be required, or partial processing of serialization or deserialization may be required.

Therefore, the additional code may be generated so as to implement at least only one of interfaces 131 and 132 shown in FIG. 4.

(8) A code that performs processing for holding a history of intermediate object 130

Intermediate object 130 may hold not only a current value but also one or more past values as the value (data) of the property. For example, a function for execution of Undo/Redo may be implemented as the member function of intermediate object 130.

Information processing apparatus 100 may automatically generate a schema file in addition to the additional code. The schema file describes a data structure of the type definition of intermediate object 130 (or asset data 300). In other words, the schema file describes the data structure of the type definition for storage as the asset data. Details of the schema file will be described later.

[E. Functional Configuration and Processing Procedure]

A functional configuration and a processing procedure of information processing apparatus 100 according to the present embodiment will now be described.

Figure 5:
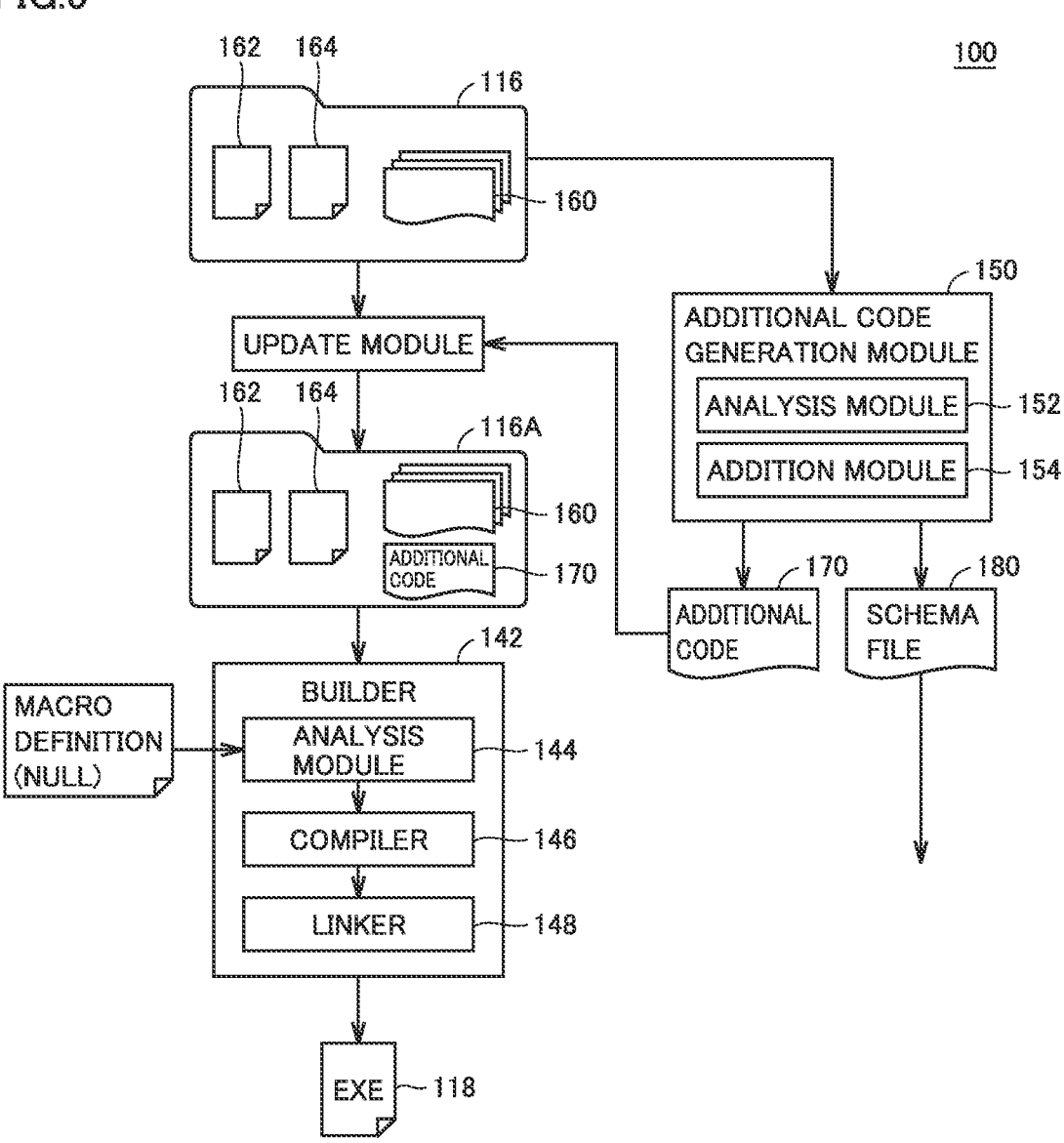
FIG. 5 shows an exemplary illustrative non-limiting drawing illustrating a functional configuration of the information processing apparatus according to the present embodiment.

Referring to FIG. 5, information processing apparatus 100 includes an update module 140, a builder 142, and an additional code generation module 150. These functional modules may be implemented by execution of development program 114 by processor 102 of information processing apparatus 100.

The user (developer of application program 118) operates a not-shown editor or the like to create project 116 including source code 160, a list of files 162 of source code 160 to be built, and setting information 164.

Additional code generation module 150 generates an additional code 170 from project 116. Additional code generation module 150 may generate a schema file 180 in addition to additional code 170. More specifically, additional code generation module 150 includes an analysis module 152 and an addition module 154.

Analysis module 152 analyzes source code 160 included in project 116, finds a serialization definition description, and constructs information for generating additional code 170 based thereon. Analysis module 152 thus identifies the type definition (the type designation description included in the serialization definition description) within source code 160 of application program 118. More specifically, analysis module 152 extracts from source code 160 of application program 118, a serialization definition description (an exemplary predetermined description) including a name designation description (an exemplary first description) designating a data name (property name) and a serialization function designation description (an exemplary second description) that designates a function or a variable for obtaining a value. Analysis module 152 then generates the type definition of intermediate object 130 based on the serialization definition description included in source code 160.

Addition module 154 generates additional code 170 based on the extracted serialization definition description and adds generated additional code 170 to source code 160 of application program 118.

Addition module 154 generates schema file 180.

Setting information 164 includes a designation as to where additional code 170 is to be stored and where schema file 180 generated together with additional code 170 is to be stored. Generated additional code 170 and schema file 180 are outputted to the designated storage.

Update module 140 adds additional code 170 generated by additional code generation module 150 to source code 160 of project 116 and adds the file name or the like of additional code 170 to list of files 162, to thereby update the list of files to a list of files 162A.

Builder 142 generates application program 118 by compiling source code 160 and additional code 170. Builder 142 generates application program 118 (executable file) from a project 116A updated by update module 140. More specifically, builder 142 includes an analysis module 144, a compiler 146, and a linker 148.

Analysis module 144 analyzes source code 160 and additional code 170 included in project 116A updated by update module 140. At this time, processing for developing a macro described in source code 160 and additional code 170 is performed. A macro definition corresponding to the serialization definition description in source code 160, however, is set to be developed on a null string. Consequently, analysis module 144 replaces the serialization definition description in source code 160 with the null string.

Compiler 146 compiles source code 160 and additional code 170 based on a result of analysis by analysis module 144 to generate an object code.

Linker 148 links the generated object code to generate application program 118 (executable file).

Though the analysis module generates information for generation of additional code 170 and thereafter the addition module generates the additional code based on that information in the example described above, the additional code may directly be generated at the time of analysis of the serialization definition description.

Figure 6:
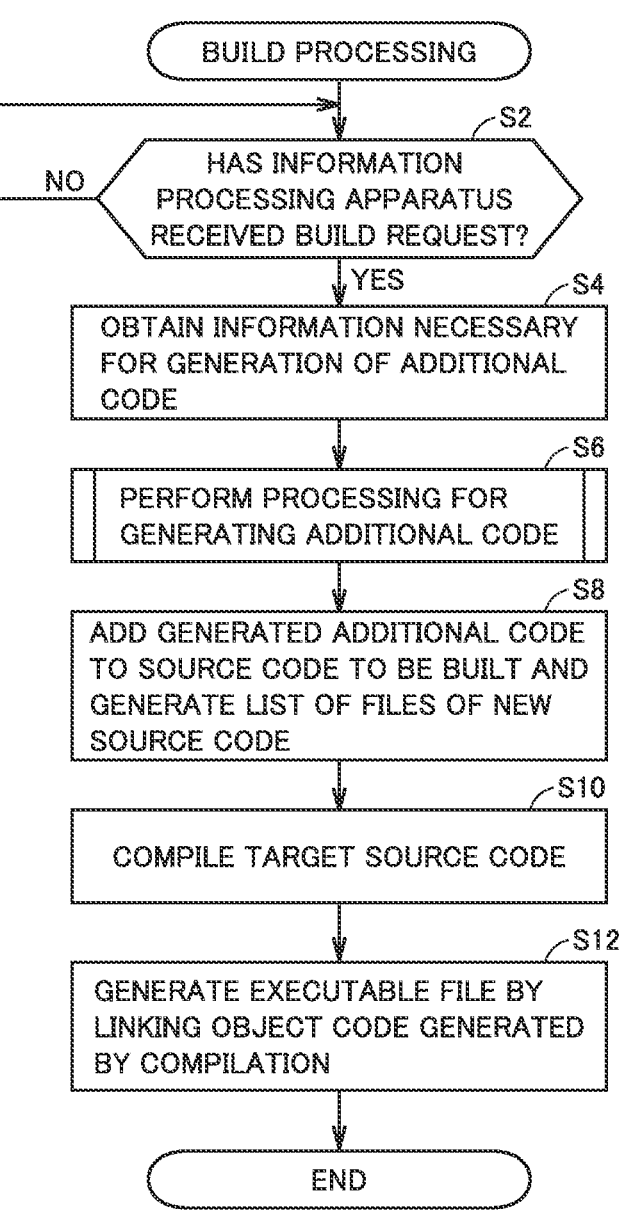
FIG. 6 shows an exemplary illustrative non-limiting flowchart illustrating a processing procedure in build processing in the information processing apparatus according to the present embodiment.

An exemplary processing procedure in build processing in information processing apparatus 100 according to the present embodiment will be described with reference to FIG. 6.

When information processing apparatus 100 receives a request for build of a library or application program 118 (YES in step S2), it initially performs processing designated to be performed before build as pre-build. It is assumed that processing for generating additional code 170 is designated as processing to be performed as pre-build.

Information processing apparatus 100 obtains information necessary for generation of additional code 170 (for example, (1) a list of files of source code 160 to be built, (2) where additional code 170 is stored, and (3) where schema file 180 generated together with additional code 170 is stored) (step S4), and performs processing for generating additional code 170 as will be described later (step S6).

Information processing apparatus 100 adds generated additional code 170 to the source code to be built to generate a list of files of a new source code to be built (step S8) and compiles a target source code (step S10). Information processing apparatus 100 then generates an executable file (application program 118) by linking an object code generated by compilation (step S12). The process thus ends.

Figure 7:
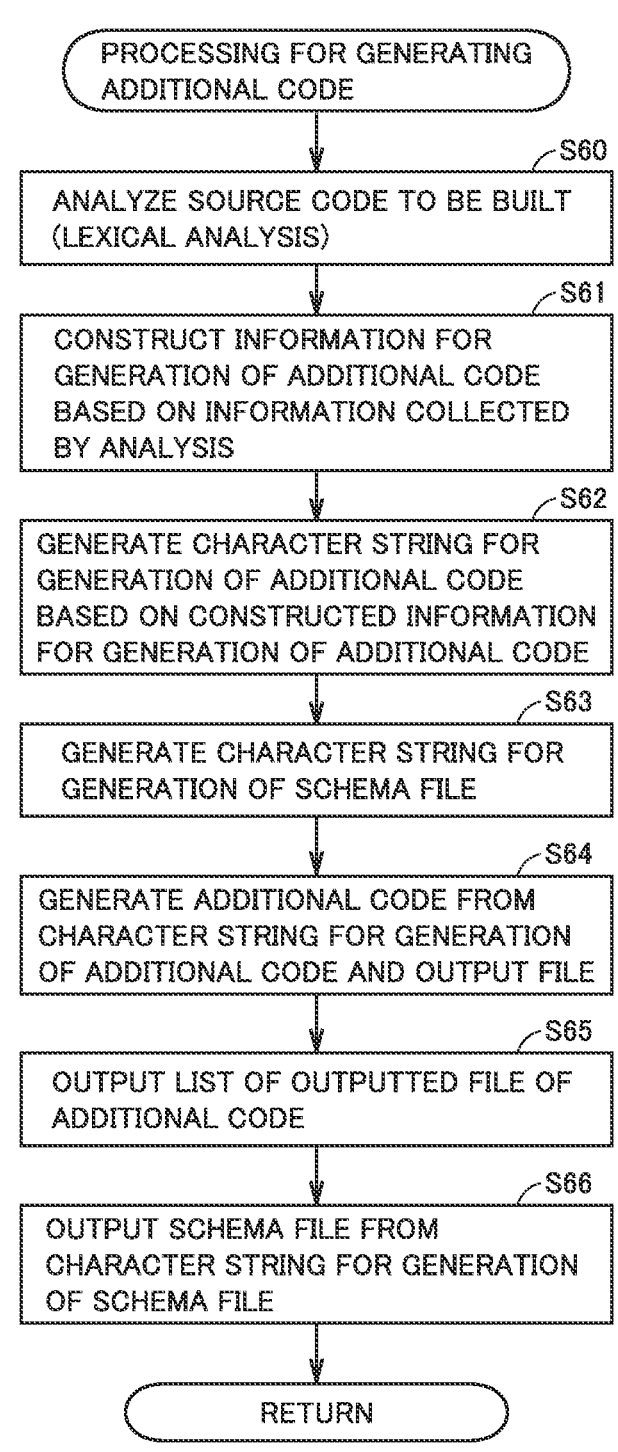
FIG. 7 shows an exemplary illustrative non-limiting flowchart illustrating a processing procedure in processing for generating an additional code (step S6) shown in FIG. 6.

An exemplary processing procedure in processing for generating additional code 170 (step S6) shown in FIG. 6 will be described with reference to FIG. 7. Referring to FIG. 7, information processing apparatus 100 (analysis module 152 shown in FIG. 5) analyzes source code 160 to be built (step S60) (lexical analysis) and constructs information for generation of the additional code based on information collected by analysis (step S61).

More specifically, in lexical analysis, information processing apparatus 100 extracts from source code 160, the serialization definition description including a name of the property included in asset data 300 and a function name for obtaining a value of the property. Information processing apparatus 100 recognizes a type to be serialized among types defined in original source code 160 based on a result of analysis of such source code 160 and generates an additional code for generation of intermediate object 130 corresponding thereto. Details of the additional code are as described above.

In succession, information processing apparatus 100 (addition module 154 shown in FIG. 5) generates a character string for generation of additional code 170 based on constructed information for generation of the additional code (step S62) and generates a character string for generation of schema file 180 (step S63).

More specifically, in step S62, information processing apparatus 100 extracts from source code 160 of application program 118, a serialization definition description (an exemplary predetermined description) including a name designation description (an exemplary first description) designating a data name (property name) and a serialization function designation description (an exemplary second description) designating a function or a variable for obtaining a value.

Finally, information processing apparatus 100 (addition module 154 shown in FIG. 5) generates additional code 170 from the character string for generation of additional code 170 and outputs a file (step S64), and outputs a list of outputted files of additional code 170 (step S65). Information processing apparatus 100 thus generates, based on the serialization definition description, additional code 170 executed as processing for holding data on a target object of application program 118 (serialization) and adds the additional code to source code 160 of application program 118.

Concurrently, information processing apparatus 100 outputs schema file 180 from the character string for generation of schema file 180 (step S66). Schema file 180 includes information for identifying the data structure of asset data 300 including one or more properties. The process then returns.

[F. Serialization Definition Description and Additional Code]

Exemplary serialization definition description and additional code in information processing apparatus 100 according to the present embodiment will now be described. The user (developer of application program 118) can also edit automatically generated additional code 170 as necessary.

(f1: Example Where Data is Held in Asset Data Under Property Name the Same as Property Name of Type Definition of Application Program)

Exemplary serialization definition description and additional code 170 generated based thereon will be described with reference to FIGS. 8A and 8B.

Referring to FIG. 8A, source code 160 created by the developer includes a type definition 40A of the MyData type. Type definition 40A includes a definition description 401 of property value1 of the integer type in accordance with grammar similar to ordinary grammar.

A serialization definition description 410 is added in type definition 40A, which characterizes the present embodiment. In the example shown in FIG. 8A, designation as the serialization target type is made by arrangement of serialization definition description 410 in type definition 40A of the serialization target type. In other words, as serialization definition description 410 is arranged in type definition 40A of the MyData type, designation of the MyData type as the serialization target type is made.

Therefore, a serialization definition description 42 implicitly includes a type designation description.

By way of example, serialization definition description 410 includes a macro name 411 "BIND_VALUE". Macro name 411 is a character string indicating that it will be replaced with an object-like macro.

Serialization definition description 410 includes as arguments, a property name 412 (an exemplary "name designation description") designating the name of the property in asset data 300, a data type definition 413 (an exemplary "data type designation description") designating the data type of the property, a function name 414 (an exemplary "serialization function designation description") designating the function to be used for serialization, and a function name 415 (an exemplary "deserialization function designation description") designating the function to be used for deserialization.

Type definition 40A includes a function definition 404 that defines a function corresponding to function name 414 designated as the argument of serialization definition description 410 and a function definition 405 that defines a function corresponding to function name 415 designated as the argument of serialization definition description 42.

FIG. 8B shows an exemplary additional code 170 automatically generated based on type definition 40A including serialization definition description 42 shown in FIG. 8A.

Additional code 170 shown in FIG. 8B includes a serialization code 50A that defines a function for reading an output value of the function designated by function name 414 which is an exemplary serialization function designation description into the property of the name designated by property name 412 which is an exemplary name designation description.

Serialization code 50A includes as arguments, a type name 416 designating the serialization target type, property name 412, and data type definition 413.

Additional code 170 shown in FIG. 8B includes a deserialization code 52A that defines a function to be passed to the function designated by function name 415 which is an exemplary deserialization function designation description.

Deserialization code 52A includes as arguments, a type name 416 designating the serialization target type, property name 412, and data type definition 413.

As application program 118 generated from project 116A including original source code 160 and additional code 170 shown in FIG. 8B is executed, a function to set the property value of intermediate object 130 or the like is implemented.

Figure 9:
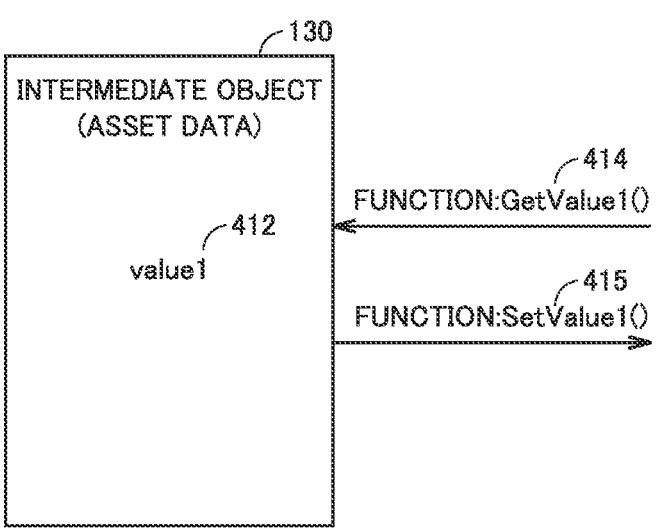
FIG. 9 shows an exemplary illustrative non-limiting drawing illustrating a software configuration implemented by the additional code shown in FIG. 8B.

FIG. 9 schematically shows a software configuration implemented by additional code 170 shown in FIG. 8B. As application program 118 including additional code 170 is executed, intermediate object 130 is generated (instantiated). Intermediate object 130 has a property having property name 412 included in serialization definition description 42.

A function to be used for serialization designated by function name 414 and a function to be used for deserialization designated by function name 415 are implemented in intermediate object 130. The function may be implemented as being explicitly read, or another procedure (for example, the member functions as shown in FIGS. 16 and 17) resulting from encapsulation of the functions may be implemented.

(f2: Example in Which Data Is Held in Asset Data Under Property Name Different from Property Name of Type Definition of Application Program)

FIGS. 8A and 8B show the example where data is held in asset data 300 under the property name the same as the property name of the type definition of application program 118. In the present embodiment, however, the data structure of asset data 300 is independent of the type definition of application program 118, and therefore data can also be held in asset data 300 under a different property name Another exemplary serialization definition description and additional code 170 generated based thereon will be described with reference to FIGS. 10A and 10B. FIGS. 10A and 10B show an exemplary code for performing processing for holding a value of a property m_Distance of an object of application program 118 in asset data 300 as a property Distance.

Referring to FIG. 10A, source code 160 created by the developer includes a type definition 40B of the MyData type. Type definition 40B includes a definition description 421 of property m_Distance of the floating point type in accordance with grammar similar to ordinary grammar Property m_Distance is a member of an object generated by running application program 118.

In type definition 40B, a serialization definition description 430 is added, and designation of the MyData type as the serialization target type is made.

By way of example, serialization definition description 430 includes a macro name 431 "BIND_VALUE". Serialization definition description 430 includes as arguments, a property name 432, a data type definition 433, a function name 434 that designates a function to be used for serialization, and a function name 435 that designates a function to be used for deserialization.

In the example shown in FIG. 10A, "distance" is designated as property name 432. Consequently, asset data 300 having property distance is generated. At this time, any name independent of the property to be held by running application program 118 can be designated.

Type definition 40B includes a function definition 424 that defines a function corresponding to function name 434 designated as the argument of serialization definition description 430 and a function definition 425 that defines a function corresponding to function name 435 designated as the argument of serialization definition description 430.

In function definition 424, a function that outputs a value of property m_Distance of the object of application program 118 is defined. In function definition 425, a function that sets a value designated as the argument as a value of property m_Distance of the object of application program 118 is defined.

FIG. 10B shows exemplary additional code 170 automatically generated based on type definition 40B including serialization definition description 430 shown in FIG. 10A.

Additional code 170 shown in FIG. 10B includes a serialization code 50B that defines a function to read an output value of the function designated by function name 434 into the property having the name designated by property name 432. Serialization code 50B includes as arguments, a type name 436 designating the serialization target type, property name 432, and data type definition 433.

Additional code 170 shown in FIG. 10B includes a deserialization code 52B that defines a function to be passed to the function designated by function name 435. Deserialization code 52B includes as arguments, type name 436 designating the serialization target type, property name 432, and data type definition 433.

"propertyValue" in serialization code 50B and deserialization code 52B is a provisional argument name indicating "reference" to a type defined by data type definition 433 (the float type in this example).

Thus, in the present embodiment, data can be held in asset data 300 under any property name independent of the property name of the object of application program 118. With such processing, advantages as below are obtained.

Such needs that use of a property name (variable name) having any prefix (for example, "m_" indicating a member variable) is desired under rules for creation of a source code, however, prefixing of asset data 300 outputted by serialization with such a prefix as "m_" is not desired can be met.

Such needs that the meaning of the property had changed in a stage in the middle of development of application program 118 and hence the property name (variable name) was changed in source code 160, however, the property name included in asset data 300 to be written out is desirably maintained as it is can be met.

Such needs that a name representing the data structure is provided as the name of the member variable of the object generated by a run-time program, however, the name representing the data structure is desirably not exposed to asset data 300 (desirably hidden) can be met. For example, though the member variable under the name "childElementLinkedList" is used on a run-time program side, the property name outputted as asset data 300 can be a name "children".

Even when a specific data structure is changed in a stage in the middle of development of application program 118, the property name included in asset data 300 can be maintained as it is.

(f3: Example Where Data Is Held by Asset Data in Data Type Different from Data Type of Application Program)

FIGS. 8A and 8B show the example where data is held by asset data 300 in the data type the same as the data type of the type definition of application program 118. In the present embodiment, however, the data structure of asset data 300 is independent of the type definition of application program 118, and hence data can also be held by asset data 300 in a different data type.

Yet another exemplary serialization definition description and additional code 170 generated based thereon will be described with reference to FIGS. 11A and 11B. FIGS. 11A and 11B show an exemplary code for performing processing for holding a value of a property m_TagHash having a hash value (the integer type) in an object of application program 118 in asset data 300 as a property Tag having a character string (the string type).

Referring to FIG. 11A, source code 160 created by the developer includes a type definition 40C of the MyData type. Type definition 40C includes a definition description 441 of a property m_TagHash of a 32-bit unsigned integer type in accordance with grammar similar to ordinary grammar Property m_TagHash is a member of an object generated by running application program 118.

In type definition 40C, a serialization definition description 450 is added, and designation of the MyData type as the serialization target type is made.

By way of example, serialization definition description 450 includes a macro name 451 "BIND_VALUE". Serialization definition description 450 includes as arguments, a property name 452, a data type definition 453, a function name 454 that designates a function to be used for serialization, and a function name 455 that designates a function to be used for deserialization.

In the example shown in FIG. 11A, "Tag" is designated as property name 452 and "string" (the string type) is designated as data type definition 453. Consequently, asset data 300 having property Tag of the string type is generated. Any data type independent of the property to be held by running application program 118 can thus be designated.

Type definition 40C includes a function definition 444 that defines a function corresponding to function name 454 designated as the argument of serialization definition description 450 and a function definition 445 that defines a function corresponding to function name 455 designated as the argument of serialization definition description 450.

In function definition 444, a function that converts the hash value held by property m_TagHash of the object of application program 118 into a character string and outputs the character string is defined. A function GetTagString is defined in a not-shown code. In function definition 445, a function that converts a value (character string) included in the asset data designated as the argument into the hash value and sets the hash value as a value of property m_TagHash of the object of application program 118 is defined.

FIG. 11B shows exemplary additional code 170 automatically generated based on type definition 40C including serialization definition description 450 shown in FIG. 11A.

Additional code 170 shown in FIG. 11B includes a serialization code 50C that defines a function to read an output value of the function designated by function name 454 into the property under the name designated by property name 452. Serialization code 50C includes as arguments, a type name 456 that designates the serialization target type, property name 452, and data type definition 453.

Serialization code 50C of additional code 170 shown in FIG. 11B is for performing processing for holding, as data corresponding to the target object, a value obtained by the function designated in the serialization function designation description or a value of the variable designated in the serialization function designation description in the data type designated by the type designation description.

Additional code 170 shown in FIG. 11B includes a deserialization code 52C that defines a function to be passed to the function designated by function name 455. Deserialization code 52C includes as arguments, type name 456 that designates the serialization target type, property name 452, and data type definition 453.

Thus, in the present embodiment, data can be held by asset data 300 in any data type independent of the data type of the property of the object of application program 118. With such processing, advantages as below are obtained.

For example, correspondence between a character string and a hash value is defined in advance, and then only the hash value of the character string is held in a run-time program. By adopting such a form of implementation, information held by the run-time program can be minimum necessary and a necessary amount of memory can be saved. This form of implementation is effective when a size of an object should be reduced due to restrictions on hardware or when information itself on the character string is not necessary for processing.

Alternatively, such processing as holding information in an encrypted binary string in asset data 300 and holding the binary string in a decrypted character string in a run-time program can also be performed. By including the encrypted character string in the asset data, information held by the run-time program can be kept secret. In addition, a data size can be made smaller by binarization of a long character string.

(f4: Example Where Data Not Held by Application Program Is Held by Asset Data)

In the present embodiment, data not held by application program 118 (run-time program) can also be held by asset data 300.

Yet another exemplary serialization definition description and additional code 170 generated based thereon will be described with reference to FIGS. 12A and 12B. FIGS. 12A and 12B show an exemplary code for performing processing for writing out a hard-coded version (a value described in source code 160) to asset data 300.

Referring to FIG. 12A, source code 160 created by the developer includes a type definition 40D of the MyData type. In type definition 40D, a serialization definition description 470 is added, and designation of the MyData type as the serialization target type is made.

By way of example, serialization definition description 470 includes a macro name 471 "BIND_VALUE". Serialization definition description 470 includes as arguments, a property name 472, a data type definition 473, a function name 474 that designates a function to be used for serialization, and a function name 475 that designates a function to be used for deserialization.

In the example shown in FIG. 12A, "AssetDataVersion" is designated as property name 472 and "int" (the integer type) is designated as data type definition 473.

Type definition 40D includes a function definition 464 that defines a function corresponding to function name 474 designated as the argument of serialization definition description 470 and a function definition 465 that defines a function corresponding to function name 475 designated as the argument of serialization definition description 470.

In function definition 464, a function that outputs "2" described in source code 160 is defined.

In function definition 465, a function that evaluates a value designated as the argument is defined. More specifically, when a value read from asset data 300 (a value indicating a version) is not "2" but "1", reading of a function EnableOldAssetBehavior is defined. Function EnableOldAssetBehavior is defined in a not-shown code, and it typically performs processing for switching an operation of a run-time program.

FIG. 12B shows exemplary additional code 170 automatically generated based on type definition 40D including serialization definition description 470 shown in FIG. 12A.

Additional code 170 shown in FIG. 12B includes a serialization code 50D that defines a function to read an output value of the function designated by function name 474 into the property having the name designated by property name 472. Serialization code 50D includes as arguments, a type name 476 that designates the serialization target type, property name 472, and data type definition 473.

Additional code 170 shown in FIG. 12B includes a deserialization code 52D that defines a function to be passed to the function designated by function name 475. Deserialization code 52D includes as arguments, type name 476 that designates the serialization target type, property name 472, and data type definition 473.

Thus, in the present embodiment, even data not held by application program 118 can be held by asset data 300. With such processing, advantages as below are obtained.

For example, as shown in FIG. 12A, by hard-coding a value in source code 160, information (for example, a version of the asset, a date, a version of a program, and the like) for identifying timing of output of asset data 300 can be embedded. Old asset data 300 which does not have to be used in a run-time program can be identified with the use of such information.

In an example where there are a plurality of values independent of each other in application program 118, such processing as bringing the plurality of values together in one matrix or vector and writing out the same to asset data 300 can be performed.

(f5: Edition of Automatically Generated Additional Code)

The user (developer of application program 118) can also freely edit automatically generated additional code 170. Exemplary edition of additional code 170 will be described below.

Exemplary edition of automatically generated additional code 170 will be described with reference to FIGS. 13A and 13B. FIGS. 13A and 13B show an example in which data held by a run-time program and data held by asset data 300 are exchanged.

FIG. 13A shows additional code 170 as in FIG. 10B. The user can freely edit additional code 170. FIG. 13B shows exemplary codes for performing processing for doubling a value of a property to be serialized obtained from the run-time program and writing out the resultant value to asset data 300 and processing for multiplying the value read from asset data 300 by 0.5 and setting the resultant value in the run-time program.

Specifically, in serialization code 50B, "* 2.0*f*" (a description 501 for doubling the value) is added. Specifically, processing for returning a value calculated by multiplying a value obtained from the object of the MyData type to be serialized by two is defined.

To the deserialization code, "* 0.5*f*" (a description 502 for multiplying a value by 0.5) is added. Specifically, processing for returning a value calculated by multiplying a value read from asset data 300 by 0.5 is defined.

Without being limited to the examples shown in FIGS. 13A and 13B, the user (developer of application program 118) can freely edit automatically generated additional code 170 in the present embodiment. Therefore, serialization of a result of any computation processing on data held by the object of the serialization target type and deserialization of a result of any computation processing on a value of asset data 300 can readily be achieved.

(f6: Exemplary Serialization Definition Description Explicitly Including Type Designation Description)

An exemplary serialization definition description explicitly including a type designation description will be described with reference to FIGS. 14A and 14B. FIG. 14A shows an exemplary code for a type definition of an external library designated as the serialization target type. A type definition 60 shown in FIG. 14A defines an ExternalLibrary- Data type including a property dataType (reference 61) of the integer type and a property floatValue (reference 62) of the floating point type.

In the example shown in FIG. 14B, source code 160 includes serialization definition descriptions 63 and 64 that designate the ExternalLibraryData type as the serialization target type.

By way of example, serialization definition descriptions 63 and 64 include macro names 631 and 641 "BIND_VAL-UE_EXTERNAL", respectively.

Serialization definition descriptions 63 and 64 include as arguments, property names 632 and 642 (exemplary "name designation description"), data type definitions 633 and 643 (exemplary "data type designation description"), function names 634 and 644 (exemplary "serialization function designation description") that designate functions to be used for serialization, and function names 635 and 645 (exemplary "deserialization function designation description") that designate functions to be used for deserialization, respectively.

Serialization definition descriptions 63 and 64 further include type names 636 and 646 (exemplary "type designation description") that designate types to be serialized, respectively.

In the example shown in FIG. 14B, each of serialization definition descriptions 63 and 64 explicitly includes a description (type designation description) that designates the serialization target type. Specifically, each of serialization definition descriptions 63 and 64 (an exemplary predetermined description) further includes the type designation description that designates the type of the object, data on which is to be held. At this time, addition module 154 (see FIG. 5) generates additional code 170 for an object generated based on the type designated in the type designation description based on the type designation description (for example, type names 636 and 646) included in the extracted serialization definition description.

In the present embodiment, the serialization definition description is not added to the defined type and property itself, but the serialization definition description that designates the name of the property included in asset data 300, the data type definition of the value of the property, the function for obtaining the value of the property, and the function for setting the value of the property is added.

Therefore, even the object of the type defined in the external library can freely be serialized and deserialized. Though the description above shows exemplary processing for adding the serialization definition description as a part of the type definition, the serialization definition description can also be arranged on the outside of the type definition.

The description that designates the type of the object to be serialized thus does not necessarily have to be arranged in the type definition. Consequently, any type of the object can be designated as a serialization target.

(17: Handling of Source Code to Which Serialization Definition Description Is Added)

Handling of the source code to which the serialization definition description is added will now be described. As described above, in the present embodiment, by addition of the serialization definition description including such a macro name as "BIND_VALUE" (see FIG. 8A and the like) and "BIND_VALUE_EXTERNAL" (see FIG. 14B and the like) to the source code, the type to be serialized and deserialized is identified.

Such a serialization definition description is handled differently between processing for generating additional code 170 and build processing for generating application program 118.

Handling of the serialization definition description in build in information processing apparatus 100 according to the present embodiment will be described with reference to FIGS. 15A to 15C.

A type definition 40E of the MyData type shown in FIG. 15A includes definition description 401 of property myValue1 of the integer type and a definition description 481 of property distance of the floating point type. Type definition 40E further includes serialization definition description 410 and a serialization definition description 490.

Serialization definition description 410 includes macro name 411 "BIND_VALUE" and serialization definition description 490 includes a macro name 491 "BIND_VALUE".

Serialization definition description 410 includes as arguments, property name 412, data type definition 413, function name 414, and function name 415. Serialization definition description 490 includes as arguments, a property name 492, a data type definition 493, a function name 494, and a function name 495.

FIG. 15B shows a state in which information for generation of an additional code is constructed based on information collected by lexical analysis in processing for generating additional code 170 (corresponding to step S61 in FIG. 7).

A type definition 40F shown in FIG. 15B results from replacement with codes 410A and 490A for generation of additional code 170 based on serialization definition descriptions 410 and 490 in type definition 40E shown in FIG. 15A. More specifically, analysis module 152 of information processing apparatus 100 generates type definition 40F by replacing the macro names included in serialization definition descriptions 410 and 490.

The first lines of codes 410A and 490A are described with an attribute syntax "_attribute_(( ))" and designate contents of the arguments of serialization definition descriptions 410 and 490 as the attribute. The second lines of codes 410A and 490A define the data structure of a union and define a member.

Information processing apparatus 100 generates additional code 170 based on contents described in codes 410A and 490A.

FIG. 15C shows an exemplary type definition 40G that has been subjected to macro processing (corresponding to step S10 in FIG. 6) in build for generation of application program 118. In the macro processing in build, a macro definition corresponding to the serialization definition description is each set to null string (null). Therefore, serialization definition descriptions 410 and 490 included in type definition shown in FIG. 15A are each replaced with the null string and thereafter compiled. The serialization definition description added other than the type definition is also similarly handled.

Builder 142 (addition module 154) of information processing apparatus 100 thus interprets the serialization definition description included in source code 160 as being invalid, and then generates application program 118. More specifically, builder 142 (addition module 154) of information processing apparatus 100 replaces the macro name with the null string.

Consequently, in build for generation of application program 118, there is substantially no influence by the serialization definition description described in the source. Aa handling is thus different between processing for generation of additional code 170 and compilation thereof for the same source, additional code 170 can automatically be generated substantially without influence a portion of the original source code.

A method of adding an attribute or the like to the type itself or the variable itself may be available as a general method of automatically generating a source code for serialization. In this method, an attribute or the like cannot be added to a type defined in the source code that cannot be changed by the builder, and cannot be serialized. In contrast, in the present embodiment, additional code 170 can be generated simply by analysis of the character string (the serialization definition description or the like) of the source code. Therefore, any type can be designated as a serialization target and deserialization target. In other words, any type can be serialized and deserialized.

In the present embodiment, the serialization definition description designates each of the function (for serialization) for obtaining a value to be held as a property value of the asset data (or the intermediate object) and a function (for deserialization) for passing the property value of the asset data (or the intermediate object) (the passed value is used in this function and set as the property value of the original source code). Therefore, the type of object 120 generated in running application program 118 does not have to match with the data structure of asset data 300 but they can be set independently of each other.

For example, by appropriate definition of a function for obtaining the value to be held in the property of the asset data (or the intermediate object) in serialization, a value that is not present as the property of object 120 can be written out to asset data 300. By appropriate definition of a function for passing the property value of the asset data (or the intermediate object) in deserialization, the type of object 120 can be changed without change of the data structure of asset data 300. In other words, the type of object 120 and the data structure of asset data 300 can be defined and changed independently of each other without affecting each other.

[G. Intermediate Object]

Intermediate object 130 generated while application program 118 generated by information processing apparatus 100 according to the present embodiment is running will now be described.

Processing of the member function of intermediate object 130 generated while application program 118 generated by information processing apparatus 100 according to the present embodiment is running will be described with reference to FIGS. 16A to 16D and 17A and 17B. FIGS. 16A to 16D show processing when a LoadTo function is called and FIGS. 17A and 17B show processing when ExtractFrom is called.

Figure 16A:
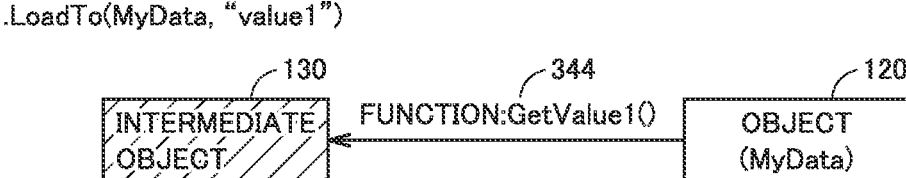
FIGS. 16A, 16B, 17A, and 17B show exemplary illustrative non-limiting drawings illustrating processing for a member function of an intermediate object generated while the application program generated by the information processing apparatus according to the present embodiment is running.
Figure 16B:
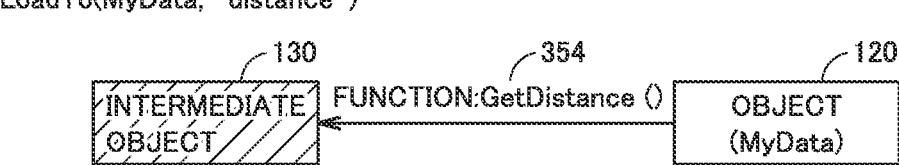

Referring to FIG. 16A, when the LoadTo function that designates property value1 is executed, a GetValue1 function indicated by function definition 404 (see FIG. 8A) of type definition 40A added to the source code is called. Similarly, referring to FIG. 16B, when the LoadTo function designating property distance is executed, a GetDistance function indicated by function definition 424 (see FIG. 10A) of type definition 40B added to the source code is called.

Figure 17A:
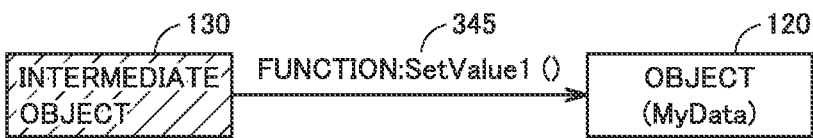
Figure 17B:
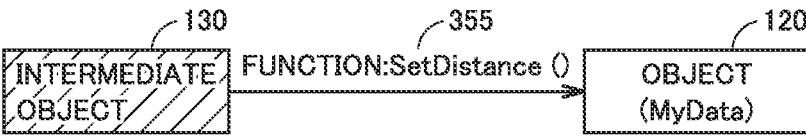

Referring to FIG. 17A, when the ExtractFrom function that designates property value1 is executed, a SetValue1 function indicated by function definition 405 (see FIG. 8A) of type definition 40A added to the source code is called. Similarly, referring to FIG. 17B, when the ExtractFrom function that designates property distance is executed, a SetDistance function indicated by function definition 425 (see FIG. 10A) of type definition 40B added to the source code is called.

Though FIGS. 16A to 16D and 17A and 17B show an example where a specific property (variable) is designated and the member function is called for the sake of convenience of description, processing can also be performed at a time for all properties held by intermediate object 130.

When the member function (the LoadTo function, the ExtractFrom function, and the like) of generated intermediate object 130 is thus executed, the function designated in the serialization definition description added at the time of generation of additional code 170 is called. Since the function designated in the serialization definition description can freely be defined, highly flexible serialization and deserialization can be achieved.

In order to implement the member function as shown in FIGS. 16A to 16D in intermediate object 130, additional code 170 may include a code for implementing in intermediate object 130, an interface (the LoadTo function) for calling a predetermined procedure (the SetDistance function or the like) for setting the value of the property held by intermediate object 130 in the designated object.

In order to implement the member function as shown in FIGS. 17A and 17B in intermediate object 130, additional code 170 may include a code for implementing in intermediate object 130, an interface (the ExtractFrom function) for calling a predetermined procedure (the GetDistance function or the like) for obtaining the value of the property and having the value held in intermediate object 130.

In the present embodiment, since intermediate object 130 is generated in correspondence with object 120 to be serialized and deserialized, reading and writing of data from and into object 120 and reading and writing of data from and into asset data 300 can independently be carried out. Therefore, more flexible serialization and deserialization can be achieved.

[H. Schema File 180]

Schema file 180 generated by information processing apparatus 100 according to the present embodiment will now be described.

Schema file 180 includes information that identifies the data structure of serialized and deserialized asset data 300. More specifically, schema file 180 includes information that identifies the data structure of the name and the value of the property. With schema file 180, asset data 300 can be generated and edited independently of application program 118.

Exemplary schema file 180 generated by information processing apparatus 100 according to the present embodiment will be described with reference to FIG. 18. FIG. 18 shows exemplary schema file 180 corresponding to type definition 40A shown in FIG. 8A.

Referring to FIG. 18, schema file 180 includes a name 181 of a corresponding type, a type ID 182 indicating the corresponding type, property information 183 and property information 184 indicating detailed information on the properties included in the asset data, and a format version 185. Each of property information 183 and property information 184 includes a name of a property included in the type definition of intermediate object 130 (or asset data 300) and information indicating the data type of the value of the property.

Information processing apparatus 100 generates schema file 180 for the property to which the serialization definition description is added in the source code. More specifically, information processing apparatus 100 (analysis module 152) obtains the data type of the name and the value of one or more properties included in asset data 300 based on the serialization definition description that designates data to be outputted as asset data 300, of data held by running application program 118.

Information processing apparatus 100 (addition module 154) generates schema file 180 including information that identifies the data structure of asset data 300 including one or more properties based on a result of analysis of source code 160. When intermediate object 130 as described above is used, data held by intermediate object 130 is outputted as asset data 300. Therefore, information processing apparatus 100 (addition module 154) may generate schema file 180 based on the type of intermediate object 130 that holds data generated while application program 118 is running and is outputted as asset data 300.

In this case, information processing apparatus 100 (addition module 154) generates schema file 180 and generates additional code 170 for implementation of intermediate object 130 that holds data outputted as asset data 300.

With schema file 180, coordination between an edition tool and application program 118 (executable file) can be facilitated. Schema file 180 may be outputted in the general-purpose format such as the JSON format or the XML format. With schema file 180 in the general-purpose format, schema file 180 can be used by various edition tools.

For example, the edition tool creates asset data 300, edits asset data 300, and has asset data 300 shown based on schema file 180.

The user performs an operation on the edition tool to generate asset data 300 (for example, test data) that can be read by application program 118 corresponding to schema file 180. The user performs an operation on the edition tool to edit asset data 300 (for example, change the value for debugging) that can be read by application program 118 corresponding to schema file 180. The edition tool adds information on corresponding schema file 180 to asset data 300 outputted from application program 118 corresponding to schema file 180 and presents the resultant data to the user.

Figure 19:
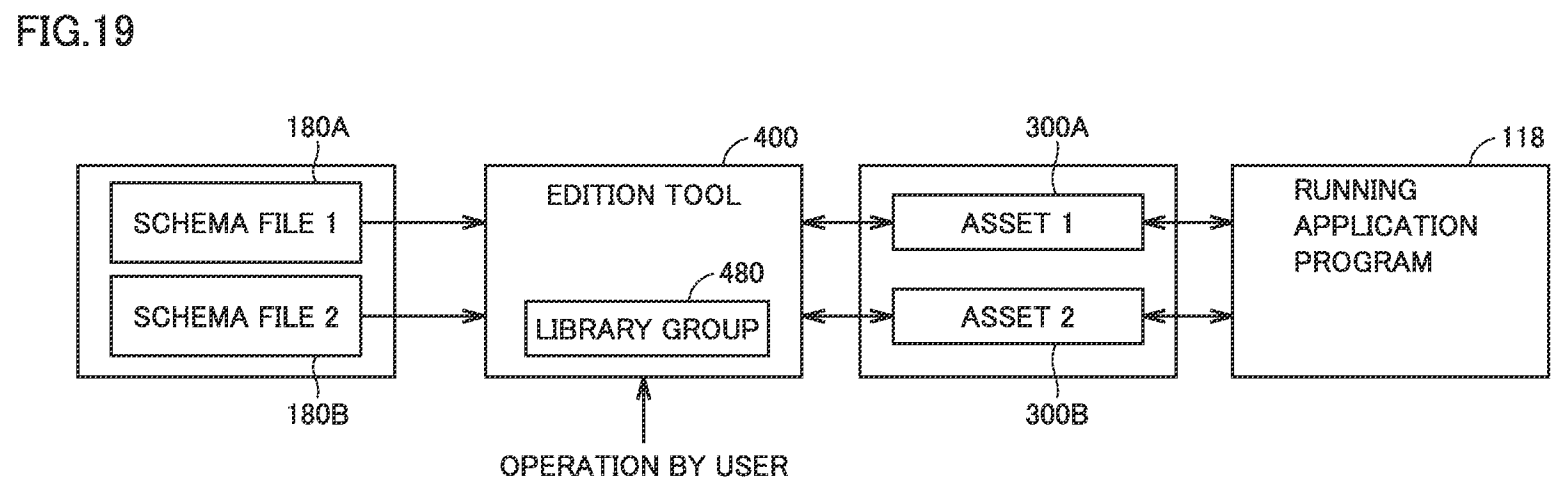

Exemplary use of schema file 180 generated by information processing apparatus 100 according to the present embodiment will be described with reference to FIGS. 19 to 21. Referring to FIG. 19, running application program 118 can write (serialization) and read (deserialization) asset data 300A and asset data 300B.

It is assumed that schema files 180A and 180B corresponding to asset data 300A and asset data 300B, respectively, are generated in advance.

An edition tool 400 can generate and edit asset data 300A and asset data 300B by referring to schema files 180A and 180B, respectively. The user performs an operation onto edition tool 400 to freely generate and edit asset data 300A and asset data 300B. For example, test data for debugging of application program 118 can readily be prepared. By checking asset data 300 written out of application program 118, a cause of a failure can readily be identified.

Edition tool 400 may be incorporated in a part of development program 114 or it may be a general-purpose application program independent of development program 114. Edition tool 400 may use a library group 480 for writing out and reading of asset data 300 in accordance with schema file 180.

Edition tool 400 may thus create or edit asset data 300 outputted from running application program 118 in accordance with an operation by the user.

Figure 20:
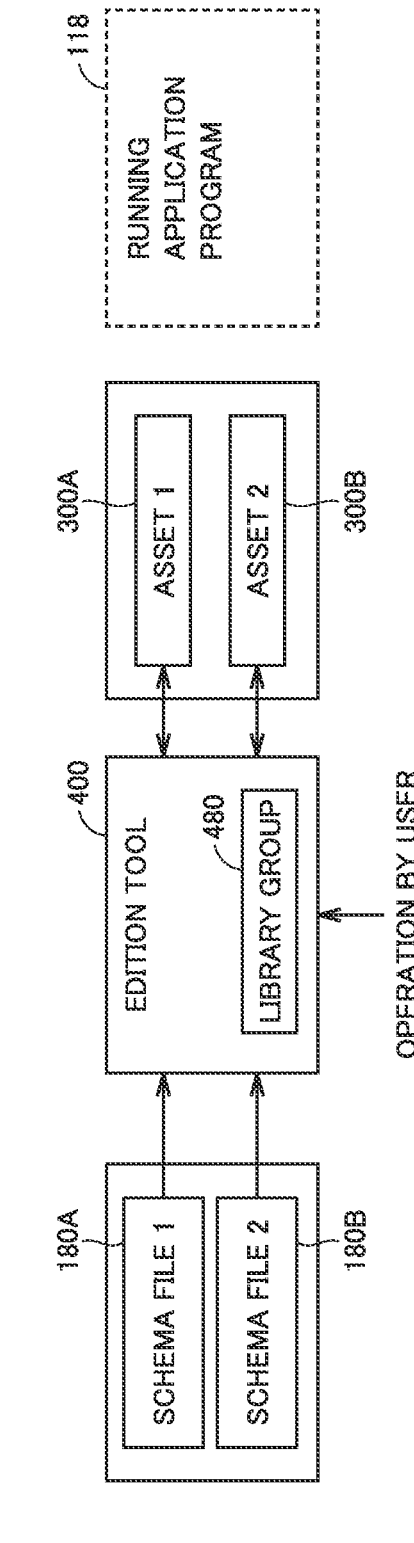

Referring to FIG. 20, edition tool 400 can freely generate and edit asset data 300 without presence of application program 118. For example, even in an off-line state where application program 118 is not running, test data or the like can be generated.

Edition tool 400 may thus create asset data 300 available to application program 118 in accordance with an operation by the user.

Figure 21:
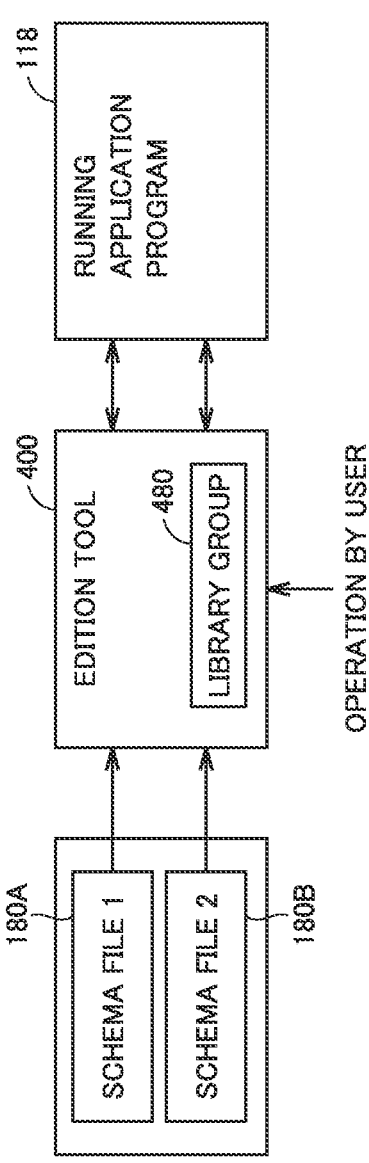

As shown in FIG. 21, data may directly be exchanged between running application program 118 and edition tool 400. By adopting such a configuration, data held by running application program 118 can directly be edited from edition tool 400. In other words, the user can edit running application program 118 in real time.

Edition tool 400 may thus receive asset data 300 outputted from running application program 118 and transmit asset data 300 to running application program 118.

With the use of schema file 180 and edition tool 400 as shown in FIGS. 19 to 21, development of application program 118 can be promoted.

In the present embodiment, additional code 170 and schema file 180 can be generated from the source code to which the serialization definition description is added. In other words, schema file 180 corresponding to the type defined in the source code for generation of application program 118 is generated. Therefore, application program 118 generated from the source code and edition tool 400 can readily be in coordination based on schema file 180.

Since schema file 180 is automatically generated, the user does not have to create schema file 180 from scratch.

[I. Modification]

Though the description above exemplifies exemplary processing in which an object-like macro which is the general-purpose function is used to add the serialization definition description (and an exclusion designation description) indicating a serialization and deserialization target to the source code, another method may be adopted.

For example, the serialization definition description (and the exclusion designation description) may be arranged in source code 160 as a comment. In other words, the serialization definition description may be added as the comment (for example, in C++, a character string started with two slash signs) in the source code. For example, a comment including a specific keyword "//[BIND_VALUE]" may be added to a variable to be serialized and deserialized.

In processing for generating additional code 170, a comment including a specific keyword may be extracted by lexical analysis and a variable described in a line from which the comment including the specific keyword has been extracted may be identified as a serialization and deserialization target. In compilation during build, on the other hand, the comment is ignored, and hence the application program can be generated substantially without influence on a portion of the original source code.

A variable to be serialized and deserialized should only be designated with any method other than the macro name and the comment.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A non-transitory computer-readable storage medium with an executable development program stored thereon, the development program being for development of an application program with a programming language in which an object is generated based on a type, the development program causing one or more processors of an information processing apparatus to perform:

generating or extracting a type definition of an object from a source code of the application program, where asset data corresponding to the object from the source code is to be generated in the information processing apparatus; and generating a schema file that describes a data structure of the type definition, the schema file includes one or more property information including details on respective properties of the asset data, whereby the schema file enables editing and generation of the asset data independent from the application program.

2. The non-transitory computer-readable storage medium according to claim 1, wherein the generating or extracting the type definition includes generating the type definition based on a predetermined description included in the source code.

3. The non-transitory computer-readable storage medium according to claim 2, wherein the predetermined description includes a name of a property included in the type definition and a description that designates a data type of a value of the property.

4. The non-transitory computer-readable storage medium according to claim 1, wherein the generating or extracting the type definition includes generating as the type definition for storage as the asset data, data corresponding to an object generated in accordance with another type definition, and the schema file describes the data structure of the type definition for storage as the asset data.

5. The non-transitory computer-readable storage medium according to claim 1, wherein the development program causes one or more processors of an information processing apparatus to perform adding the type definition and a code that generates an object based on the type definition to the source code of the application program.

6. The non-transitory computer-readable storage medium according to claim 5, wherein the code that generates the object, and the schema file are concurrently generated.

7. The non-transitory computer-readable storage medium according to claim 1, wherein the one or more property information includes a name of a property included in the type definition and information indicating a data type of a value of the property.

8. The non-transitory computer-readable storage medium according to claim 1, wherein the generating the schema file includes outputting the schema file in a general-purpose format.

9. The non-transitory computer-readable storage medium according to claim 1, wherein the development program causes one or more processors of an information processing apparatus to perform generating asset data for testing the application program.

10. The non-transitory computer-readable storage medium according to claim 9, wherein the development program causes one or more processors of an information processing apparatus to perform testing the application program using the asset data generated for testing.

11. An information processing system that develops an application program with a programming language in which an object is generated based on a type, the information processing system comprising:

a memory which the application program under development is stored and in which asset data is stored; and one or more processors configured to perform:

generating or extracting a type definition of an object from a source code of the application program, where the asset data corresponds to the object from the source code;

generating a schema file that describes a data structure of the type definition, the schema file includes one or more property information including details on respective properties of the asset data; and edition processing comprising at least one of creation, edition, or presentation of the asset data independently from the application program based on the schema file.

12. The information processing system according to claim 11, wherein the edition processing comprises creating or editing the asset data outputted from the application program in accordance with an operation by a user.

13. The information processing system according to claim 11, wherein the edition processing comprises creating the asset data available to the application program in accordance with an operation by a user.

14. The information processing system according to claim 11, wherein the edition processing comprises receiving the asset data outputted from a running application program and transmitting the asset data to the running application program.

15. An information processing apparatus comprising:

one or more processors; and a memory where a development program for development of an application program with a programming language in which an object is generated based on a type and asset data are stored, wherein the information processing apparatus is configured to perform, by execution of the development program by the one or more processors, generating or extracting a type definition of an object from a source code of the application program, where the asset data corresponds to the object from the source code, and generating a schema file that describes a data structure of the type definition, the schema file includes one or more property information including details on respective properties of the asset data, whereby the schema file enables editing or generation of the asset data independent from the application program.

16. An information processing method performed by a computer for development of an application program with a programming language in which an object is generated based on a type, the information processing method comprising:

generating or extracting a type definition of an object from a source code of the application program, where asset data corresponds to the object from the source code; and generating a schema file that describes a data structure of the type definition, the schema file includes one or more property information including details on respective properties of the asset data, whereby the schema file enables editing or generation of the asset data independent from the application program.

* * * * *